(12) United States Patent
Garwood

(10) Patent No.: US 7,093,734 B2
(45) Date of Patent: Aug. 22, 2006

(54) TRAY WITH SIDE RECESSES AND CHANNELS FOR GAS TRANSFER

(75) Inventor: Anthony J. M. Garwood, Mercer Island, WA (US)

(73) Assignee: SafeFresh Technologies, LLC, Mercer Island, WA (US)

( * ) Notice: Subject to any disclaimer, the term of this patent is extended or adjusted under 35 U.S.C. 154(b) by 508 days.

(21) Appl. No.: 10/384,874

(22) Filed: Mar. 7, 2003

(65) Prior Publication Data

US 2003/0152675 A1 Aug. 14, 2003

Related U.S. Application Data

(60) Division of application No. PCT/US03/00167, filed on Jan. 2, 2003, which is a continuation-in-part of application No. 10/320,863, filed on Dec. 16, 2002, now abandoned, and a continuation-in-part of application No. 10/027,929, filed on Dec. 20, 2001, now Pat. No. 6,866,832, and a continuation-in-part of application No. 10/037,440, filed on Jan. 2, 2002, now abandoned, and a continuation-in-part of application No. PCT/US01/45146, filed on Nov. 28, 2001, and a continuation-in-part of application No. 09/724,287, filed on Nov. 28, 2000, now abandoned, which is a continuation-in-part of application No. PCT/US00/29038, filed on Oct. 19, 2000, which is a continuation-in-part of application No. 09/550,399, filed on Apr. 14, 2000, now abandoned, which is a continuation-in-part of application No. 09/392,074, filed on Sep. 8, 1999, now abandoned, which is a continuation of application No. 09/039,150, filed on Mar. 13, 1998, now abandoned.

(60) Provisional application No. 60/040,556, filed on Mar. 13, 1997, provisional application No. 60/129,595, filed on Apr. 15, 1999, provisional application No.

(Continued)

(51) Int. Cl.
*B65D 6/10* (2006.01)

(52) U.S. Cl. .................................. 220/675; 426/129

(58) Field of Classification Search ............... 220/747, 220/745, 748, 776, 913, 670, 675, 608; 206/521.11, 206/497, 204, 524.4, 557; 426/129, 118, 426/113
See application file for complete search history.

(56) References Cited

U.S. PATENT DOCUMENTS 665,349 A * 1/1901 Sewall .................... 220/560.1

(Continued)

FOREIGN PATENT DOCUMENTS

EP 0 284 502 A1 9/1988

(Continued)

OTHER PUBLICATIONS

The Flavaloc System, Garwood Limited advertising brochure, 1986.
"Meat Processing's Missing Link," *Food Quality Magazine*, Oct. 1996.

(Continued)

*Primary Examiner*—Nathan J. Newhouse
*Assistant Examiner*—Eugene Lhymn
(74) *Attorney, Agent, or Firm*—Christensen O'Connor Johnson Kindness PLLC

(57) ABSTRACT

Packaging methods and apparatus for bonding a lidding web to a tray web, characterized in that the lidding web is placed under tension in both the longitudinal and lateral directions before being bonded to a tray web. A tray web having recesses and channels that form a conduit when the tray web is overwrapped with a lidding web is provided. A lidding web has microperforations to control the transfer of gases.

11 Claims, 28 Drawing Sheets

Related U.S. Application

Data60/141,569, filed on Jun. 29, 1999, provisional application No. 60/144,400, filed on Jul. 16, 1999, provisional application No. 60/148,227, filed on Jul. 27, 1999, provisional application No. 60/149,938, filed on Aug. 19, 1999, provisional application No. 60/152,677, filed on Sep. 7, 1999, provisional application No. 60/154,068, filed on Sep. 14, 1999, provisional application No. 60/160,445, filed on Oct. 19, 1999, provisional application No. 60/175,372, filed on Jan. 10, 2000, provisional application No. 60/255,684, filed on Dec. 13, 2000, provisional application No. 60/286,688, filed on Apr. 26, 2001, provisional application No. 60/291,872, filed on May 17, 2001, provisional application No. 60/299,240, filed on Jun. 18, 2001, provisional application No. 60/312,176, filed on Aug. 13, 2001, provisional application No. 60/314,109, filed on Aug. 21, 2001, provisional application No. 60/323,629, filed on Sep. 19, 2001, provisional application No. 60/335,760, filed on Oct. 19, 2001, provisional application No. 60/373,222, filed on Apr. 15, 2002, provisional application No. 60/373,232, filed on Apr. 16, 2002, provisional application No. 60/385,710, filed on Jun. 3, 2002, provisional application No. 60/388,067, filed on Jun. 10, 2002, provisional application No. 60/391,702, filed on Jun. 24, 2002, provisional application No. 60/411,138, filed on Sep. 16, 2002, provisional application No. 60/422,949, filed on Oct. 30, 2002, provisional application No. 60/424,388, filed on Nov. 5, 2002, provisional application No. 60/427,516, filed on Nov. 19, 2002, provisional application No. 60/429,644, filed on Nov. 25, 2002, provisional application No. 60/433,526, filed on Dec. 13, 2002.

U.S. PATENT DOCUMENTS

| Patent No. | | Date | Name |
|---|---|---|---|
| 2,596,514 | A | 5/1952 | Uehlein |
| 3,067,015 | A | 12/1962 | Lawdermilt |
| 3,366,309 | A | 1/1968 | Scharre |
| 3,396,430 | A | 8/1968 | Westcott |
| 3,480,197 | A * | 11/1969 | Massey ............... 229/120 |
| 3,481,100 | A | 12/1969 | Bergstrom |
| 3,851,080 | A | 11/1974 | Lugg et al. |
| 3,930,040 | A | 12/1975 | Woodruff |
| 4,022,384 | A * | 5/1977 | Hoyle et al. ............ 239/542 |
| 4,114,348 | A | 9/1978 | Mahaffy et al. |
| 4,171,164 | A | 10/1979 | Groves et al. |
| 4,201,030 | A | 5/1980 | Mahaffy et al. |
| 4,244,978 | A | 1/1981 | Barta |
| 4,252,268 | A * | 2/1981 | Haire ............... 229/120 |
| 4,314,451 | A | 2/1982 | Leeds et al. |
| 4,363,263 | A | 12/1982 | Williams |
| 4,476,686 | A | 10/1984 | Madsen et al. |
| 4,552,600 | A | 11/1985 | Laiewski et al. |
| 4,569,204 | A | 2/1986 | Ott et al. |
| 4,576,278 | A | 3/1986 | Laiewski et al. |
| 4,594,253 | A | 6/1986 | Fradlin |
| 4,597,503 | A * | 7/1986 | Lates ............... 220/676 |
| 4,642,239 | A | 2/1987 | Ferrar et al. |
| 4,685,274 | A | 8/1987 | Garwood |
| 4,726,173 | A | 2/1988 | Giatti |
| 4,744,199 | A | 5/1988 | Gannon |
| 4,798,324 | A | 1/1989 | Gannon |
| 4,818,548 | A | 4/1989 | Cheng |
| 4,840,271 | A | 6/1989 | Garwood |
| 4,901,876 | A * | 2/1990 | Box ............... 220/533 |
| 4,987,725 | A | 1/1991 | Gill |
| 4,992,287 | A | 2/1991 | Dreano |
| 5,025,611 | A | 6/1991 | Garwood |
| 5,034,235 | A | 7/1991 | Dunn et al. |
| 5,042,540 | A | 8/1991 | Gorlich |
| 5,103,618 | A | 4/1992 | Garwood |
| 5,115,624 | A | 5/1992 | Garwood |
| 5,129,512 | A | 7/1992 | Garwood |
| 5,155,974 | A | 10/1992 | Garwood |
| 5,171,593 | A * | 12/1992 | Doyle ............... 426/106 |
| 5,226,531 | A | 7/1993 | Garwood |
| 5,306,466 | A | 4/1994 | Goldsmith |
| 5,323,590 | A | 6/1994 | Garwood |
| 5,334,405 | A | 8/1994 | Gorlich |
| 5,348,752 | A | 9/1994 | Gorlich |
| 5,352,467 | A | 10/1994 | Mitchell et al. |
| 5,393,547 | A | 2/1995 | Balaban et al. |
| 5,419,101 | A | 5/1995 | Gorlich et al. |
| 5,433,142 | A | 7/1995 | Roth |
| 5,447,736 | A | 9/1995 | Gorlich |
| 5,460,833 | A | 10/1995 | Andrews et al. |
| 5,478,990 | A | 12/1995 | Montanari et al. |
| 5,479,759 | A | 1/1996 | Gorlich et al. |
| 5,481,852 | A | 1/1996 | Mitchell |
| 5,514,392 | A | 5/1996 | Garwood |
| 5,520,005 | A | 5/1996 | Appolonia |
| 5,534,282 | A | 7/1996 | Garwood |
| 5,547,694 | A | 8/1996 | Perry et al. |
| 5,560,182 | A | 10/1996 | Garwood |
| 5,587,192 | A * | 12/1996 | Beizermann ............... 426/118 |
| 5,590,602 | A | 1/1997 | Peck et al. |
| 5,591,496 | A | 1/1997 | Anderson et al. |
| 5,597,561 | A | 1/1997 | Kross |
| 5,597,597 | A | 1/1997 | Newman |
| 5,597,599 | A | 1/1997 | Smith et al. |
| 5,622,725 | A | 4/1997 | Kross |
| 5,628,959 | A | 5/1997 | Kross |
| 5,629,060 | A | 5/1997 | Garwood |
| 5,651,977 | A | 7/1997 | Kross |
| 5,655,708 | A | 8/1997 | Gröne |
| 5,667,817 | A | 9/1997 | Kross |
| 5,667,827 | A | 9/1997 | Breen et al. |
| 5,668,634 | A | 9/1997 | Newman |
| 5,676,736 | A | 10/1997 | Crozel |
| 5,686,126 | A | 11/1997 | Noel et al. |
| 5,686,127 | A * | 11/1997 | Stockley et al. ............ 426/129 |
| 5,693,354 | A | 12/1997 | Spencer et al. |
| 5,698,250 | A | 12/1997 | DelDuca et al. |
| 5,709,897 | A | 1/1998 | Pearlstein |
| 5,718,101 | A | 2/1998 | Noel et al. |
| 5,720,915 | A | 2/1998 | Joppen et al. |
| 5,730,311 | A | 3/1998 | Curtis |
| 5,731,023 | A | 3/1998 | Milani |
| 5,772,985 | A | 6/1998 | Kemp et al. |
| 5,779,832 | A | 7/1998 | Kocher |
| 5,816,488 | A | 10/1998 | Moeder |
| 5,823,867 | A | 10/1998 | Roth et al. |
| 5,833,894 | A | 11/1998 | Lanzani et al. |
| RE36,064 | E | 1/1999 | Davidson et al. |
| 5,865,293 | A | 2/1999 | Napadow |
| 5,871,795 | A | 2/1999 | Roth |
| 5,882,916 | A | 3/1999 | Wiersma |
| 5,885,637 | A | 3/1999 | Roth et al. |
| 5,885,640 | A | 3/1999 | Andersson |
| 5,944,749 | A | 8/1999 | Fenn |
| 5,948,457 | A | 9/1999 | DelDuca et al. |
| 5,950,402 | A | 9/1999 | Hoddinott |
| 5,994,706 | A | 11/1999 | Allen et al. |
| 5,996,155 | A | 12/1999 | Chao et al. |
| 6,010,727 | A | 1/2000 | Rosenthal |
| 6,036,918 | A | 3/2000 | Kowanko |
| 6,039,991 | A | 3/2000 | Ruozi |
| 6,042,859 | A | 3/2000 | Shaklai |
| 6,046,243 | A | 4/2000 | Wellinghoff et al. |
| 6,054,161 | A | 4/2000 | Palmer |
| 6,054,164 | A | 4/2000 | Roth |
| 6,063,425 | A | 5/2000 | Kross et al. |
| 6,066,348 | A | 5/2000 | Yuan et al. |

| | | |
|---|---|---|
| 6,085,930 A | 7/2000 | Curtis |
| 6,086,833 A | 7/2000 | Conners et al. |
| 6,096,350 A | 8/2000 | Kemp et al. |
| 6,120,731 A | 9/2000 | Kross et al. |
| 6,123,966 A | 9/2000 | Kross |
| 6,142,067 A | 11/2000 | Roth |
| 6,148,249 A | 11/2000 | Newman |
| 6,162,477 A | 12/2000 | Crisinel et al. |
| 6,167,709 B1 | 1/2001 | Caracciolo, Jr. et al. |
| 6,180,585 B1 | 1/2001 | Schalitz et al. |
| 6,183,807 B1 | 2/2001 | Gutzmann et al. |
| 6,194,012 B1 | 2/2001 | Palmer |
| 6,200,618 B1 | 3/2001 | Smith et al. |
| 6,210,730 B1 | 4/2001 | Mitchell |
| 6,285,030 B1 | 9/2001 | Williams et al. |
| 6,294,791 B1 | 9/2001 | Williams et al. |
| 6,328,909 B1 | 12/2001 | Kross et al. |
| 6,331,272 B1 | 12/2001 | Sims |
| 6,342,261 B1 | 1/2002 | Spencer |
| 6,349,526 B1 | 2/2002 | Newman |
| 6,372,273 B1 * | 4/2002 | Mabry et al. .............. 426/129 |
| 6,379,728 B1 | 4/2002 | Roth |
| 6,387,426 B1 | 5/2002 | Roth |
| 6,389,838 B1 | 5/2002 | Roth |
| 6,406,728 B1 | 6/2002 | Roth |
| 6,430,467 B1 | 8/2002 | D'Amelio et al. |
| 6,434,950 B1 | 8/2002 | Newman et al. |
| 2001/0042841 A1 | 11/2001 | Lyons et al. |
| 2002/0001648 A1 | 1/2002 | Roth |
| 2002/0015777 A1 | 2/2002 | Roth |
| 2002/0017203 A1 | 2/2002 | Roth |
| 2002/0043050 A1 | 4/2002 | Costello et al. |
| 2002/0075754 A1 | 6/2002 | Huber et al. |
| 2002/0075755 A1 | 6/2002 | Huber et al. |
| 2002/0110624 A1 | 8/2002 | Roth |
| 2002/0150659 A1 | 10/2002 | Roth |
| 2002/0162971 A1 | 11/2002 | Koenck et al. |
| 2003/0017252 A1 | 1/2003 | Roth |
| 2003/0155362 A1 * | 8/2003 | Kiel et al. .............. 220/359.1 |

FOREIGN PATENT DOCUMENTS

| | | |
|---|---|---|
| EP | 0 415 521 A1 | 6/1990 |
| EP | 0 899 209 A2 | 5/1994 |
| EP | 0 755 875 A1 | 1/1997 |
| EP | 0 820 029 A2 | 1/1998 |
| EP | 0 649 282 B1 | 9/1998 |
| EP | 0 820 029 A3 | 5/1999 |
| EP | 0 649 283 B1 | 2/2002 |
| FR | 2 290 153 | 4/1976 |
| FR | 2 744 920 A1 | 8/1997 |
| GB | 393935 | 6/1933 |
| GB | 484195 | 5/1938 |
| GB | 2 247 524 A | 3/1992 |
| GB | 2 285 126 A | 6/1995 |
| GB | 2 315 584 A | 2/1998 |
| WO | WO 91/03400 | 3/1991 |
| WO | WO 91/03407 | 3/1991 |
| WO | WO 91/10593 | 7/1991 |
| WO | WO 92/10939 | 9/1992 |
| WO | WO 93/17562 | 9/1993 |
| WO | WO 93/25082 | 12/1993 |
| WO | WO 94/00997 | 1/1994 |
| WO | WO 94/06689 | 3/1994 |
| WO | WO 94/24875 | 11/1994 |
| WO | WO/94/24875 A1 | 11/1994 |
| WO | WO 94/27868 | 12/1994 |
| WO | WO 95/10944 | 4/1995 |
| WO | WO 96/24470 | 8/1996 |
| WO | WO 99/12664 A1 | 3/1999 |
| WO | WO 99/13741 A1 | 3/1999 |
| WO | WO 01/11993 A1 | 2/2001 |

OTHER PUBLICATIONS

"Measure for Measure," *The National Provisioner*, 1997.

"In-line Composition Analysis Using Guided Microwave Spectrometry," *Processing*, 1998.

1999 Food Processing Award to Guided Microwave Spectrometry, *Food Processing*, Oct. 1999.

Guided Microwave Spectrometry, Epsilon Industrial product information, 1994.

Jordan, S.L., et al., "Augmentation of Killing *Escherichia coli* O157 by Combinations of Lactate, Ethanol, and Low-pH Conditions," *Applied and Environmental Microbiology*, vol. 65, No. 3, Mar. 1999, pp. 1308-1311.

Food Safety and Inspection Service, "Guidance for Beef Grinders and Suppliers of Boneless Beef and Trim Products," Sep. 2002, 28 pages.

Food Safety and Inspection Service, "FSIS DIRECTIVE 6700.1, Retained Water in Raw Meat and Poultry Products," Nov. 27, 2002 (effective date: Jan. 9, 2003), 11 pages.

Rulis, A.M., "Agengy Response Letter, GRAS Notice No. GRN 000083," U.S. Food and Drug Administration, Office of Food Additive Safety, Feb. 21, 2002, 3 pages.

* cited by examiner

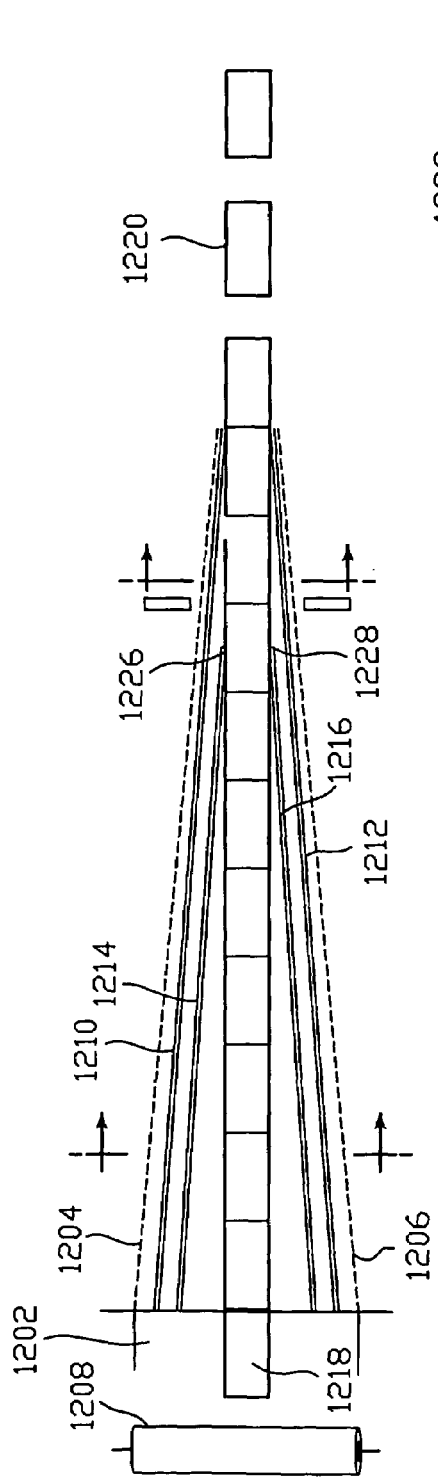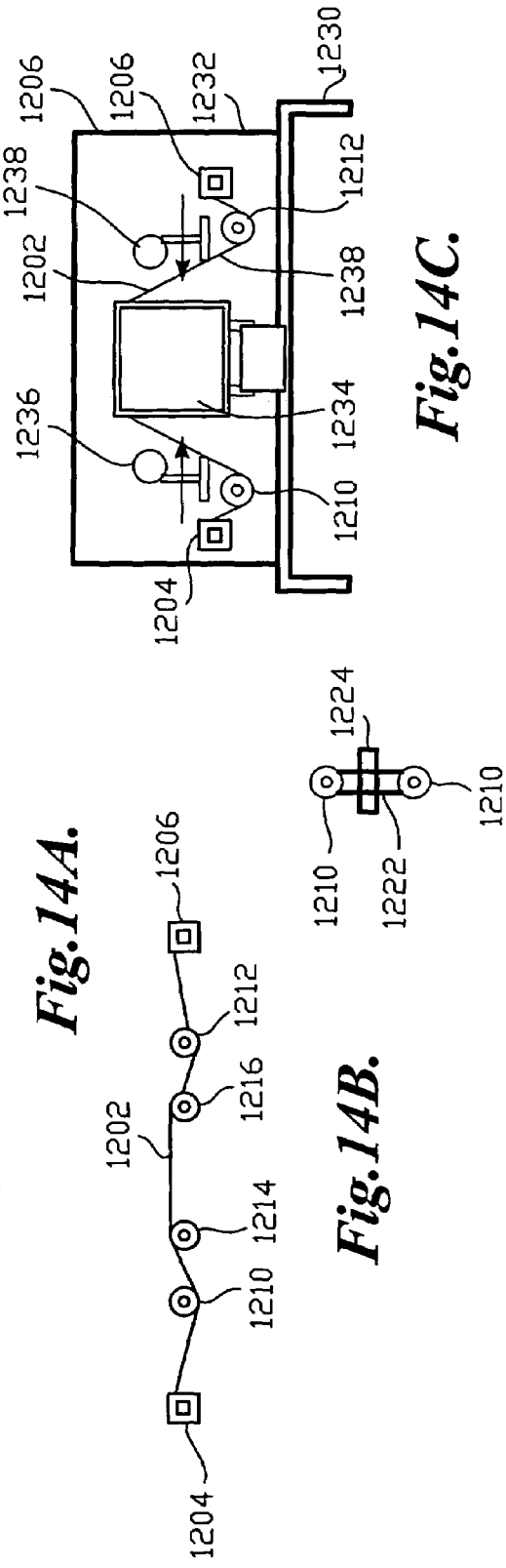

TRAY WITH SIDE RECESSES AND CHANNELS FOR GAS TRANSFER

CROSS-REFERENCE(S) TO RELATED APPLICATIONS

This application is a divisional of PCT/US03/00167, filed Jan. 2, 2003, which is a continuation-in-part of application Ser. No. 10/320,863, filed Dec. 16, 2002; now abandoned Ser. No. 10/027,929, filed Dec. 20, 2001; now U.S. Pat. No. 6,866,832 Ser. No. 10/037,440, filed Jan. 2, 2002; now abandoned PCT/US01/45146, filed Nov. 28, 2001 and 09/724,287, filed Nov. 28, 2000, now abandoned which is a continuation-in-part of Application No. PCT/US00/29038, filed Oct. 19, 2000, which is a continuation-in-part of application Ser. No. 09/550,399, filed Apr. 14, 2000, now abandoned, which is a continuation-in-part of application Ser. No. 09/392,074, filed Sep. 8, 1999, now abandoned, which is a continuation of application Ser. No. 09/039,150, filed Mar. 13, 1998, now abandoned, which claims the benefit of Provisional Application No. 60/040,556, filed Mar. 13, 1997. Application Ser. No. 09/550,399 claims the benefit of Provisional Application Nos. 60/129,595, filed Apr. 15, 1999; 60/141,569, filed Jun. 29, 1999; 60/144,400, filed Jul. 16, 1999; 60/148,227, filed Jul. 27, 1999; 60/149,938, filed Aug. 19, 1999; 60/152,677, filed Sep. 7, 1999; 60/154,068, filed Sep. 14, 1999; 60/160,445, filed Oct. 19, 1999; and 60/175,372, filed Jan. 10, 2000. Application No. PCT/US01/45146 claims the benefit of Provisional Application Nos. 60/255,684, filed Dec. 13, 2000; 60/286,688, filed Apr. 26, 2001; 60/291,872, filed May 17, 2001; 60/299,240, filed Jun. 18, 2001; 60/312,176, filed Aug. 13, 2001; 60/314,109, filed Aug. 21, 2001; 60/323,629, filed Sep. 19, 2001; and 60/335,760, filed Oct. 19, 2001. Application No. PCT/US03/00167 claims the benefit of Provisional Application Nos. 60/373,222, filed Apr. 15, 2002; 60/373,232, filed Apr. 16, 2002; 60/385,710, filed Jun. 3, 2002; 60/388,067, filed Jun. 10, 2002; 60/391,702, filed Jun. 24, 2002; 60/411,138, filed Sep. 16, 2002; 60/422,949, filed Oct. 30, 2002; 60/424,388, filed Nov. 5, 2002; 60/427,516, filed Nov. 19, 2002; 60/429,644, filed Nov. 25, 2002; and 60/433,526, filed Dec. 13, 2002. All the above applications are herein expressly incorporated by reference in their entirety for all purposes.

FIELD OF THE INVENTION

The present invention relates to the packaging of perishable goods in a selected gas and most particularly packaging in low oxygen environments.

BACKGROUND OF THE INVENTION

Methods of boning, grinding, and subsequent packaging of beef in a substantially oxygen-free environment have been disclosed in PCT/US01/45146. In one aspect, these steps occurred in an essentially continuous and enclosed conduit. The method results in a food item, such as beef, having high amounts of deoxymyoglobin. The beef, high in deoxymyoglobin, is then packaged in oxygen free individual trays and depending on the ultimate destination, may be packaged in master containers. Master containers are used to transport the individual beef packages in a substantially oxygen-free state up to the point of sale. In either event, however, it is desirable that oxygen is exchanged with the controlled atmosphere within the individual packages prior to sale to allow the beef to produce a bright red color, known as "bloom" (or oxymyoglobin), that is visually pleasing to consumers. The previous application disclosed trays with means, such as apertures in the tray and in the overwrapping lidding webs at strategic locations to provide for the rapid exchange of the controlled gas within the packaged trays for the oxygen in air outside of the packaged trays while restricting leaking of liquid therefrom. Other ways of exchanging the controlled atmosphere for air and oxygen included an oxygen permeable package that comprises a polypropylene thermoformed tray with a plasticized polyvinyl chloride web hermetically sealed to the flanges of the tray. In this manner, gas exchange occurs by permeation through the permeable packaging materials.

When a retail package with controlled atmosphere therein is removed from an oxygen-free atmosphere and placed in the normal ambient air atmosphere, the controlled gas in the free spaces on the inside of the package is displaced by atmospheric gases over time by the normal process of diffusion. It has been observed that a deleterious phenomena can occur to the beef if the oxygen content in the packages is not elevated from 0.05% to at least 3% oxygen within about 15 minutes, and sometimes this effect even occurs if the oxygen content of the package is not elevated from 0.05% to at least 10% oxygen within about 10 minutes. Without this rapid elevation in oxygen content, it has been observed that the physical and chemical mechanisms taking place on the surface of the beef favor the production of increased amounts of undesirable metmyoglobin relative to the desirable brightly colored red oxymyoglobin. Therefore, it is advantageous to produce methods and materials to exchange gases within the allotted time to reduce the production of metmyoglobin and the unsightly appearance caused by it.

Microperforated wrapping materials have been known and used in the food industry; however, one drawback that has been observed is "weeping" or the purge of liquids associated with the meat contents through the microperforations. This weeping effects the quality of the packaged meat in two ways. First, condensation from the weeping liquids can accumulate on the internal surfaces of the retail package. These water droplets can hinder the diffusion of gases to the extent that the gas exchange can be slowed to several hours. Second, previous attempts to use microperforated materials as an overwrapping web material resulted in direct contact of the microperforated web with the food item of the package. It was later found that weeping of liquids through the package as a result of this contact, occurred to such an extent that made it unacceptable to consumers.

Therefore, there is a need to refine the methods and materials useful in the packaging of perishable food items within enclosed conduits, including the use of microperforated lidding webs to provide a desired gas diffusion rate without allowing the escape of liquids from the package. Also lacking in the prior art are methods and apparatus that can apply longitudinal and lateral tension on a web of lidding material. The present invention fulfills these needs and provides further related advantages.

SUMMARY OF THE INVENTION

One aspect of the invention is a package having a first web defining a cavity and a second web bonded to the first web, wherein the second web includes microperforations at a location that is specific to minimize the escape of liquids from the cavity to the exterior of the package. In one particular embodiment, the first web defines a four-sided cavity with walls, a flange, and corresponding flaps attached to the flange that can be folded and bonded to the cavity walls. The second web is an overwrapping lidding web, wherein microperforations are provided on the lidding web at a predetermined location. For example, the microperforations are aligned with a flap recess, which in turn is in communication with the interior of the tray cavity. In this manner, suitably rapid gas exchange can occur with minimal to no escape of liquids from the tray cavity.

Microperforations of the type that can be produced by lasers can be introduced into the tray or to the overwrapping lidding web materials to increase the gas exchange rate to within acceptable limits to, in addition to rapid production of oxymyoglobin (bloom), surpass the zone of rapid metmyoglobin formation.

Another aspect of the invention is a method of exchanging the gas of a controlled atmosphere package with the ambient atmospheric air by including microperforations in a web. In one particular embodiment, a tray web with flaps is overwrapped with a lidding web, wherein the lidding web is provided with the microperforations at a predetermined location, more specifically, adjacent to a flap recess. In this manner the amount of weep is reduced to acceptable quantities or may be eliminated altogether.

Another aspect of the invention is a method of reducing or substantially eliminating the amount of liquid weep from a package by allowing accumulation of the liquid in a recess. In one particular embodiment, a tray web with flaps is overwrapped with a lidding web. The flap includes an enclosed recess that is in communication with the tray cavity. The recess is overwrapped with a lidding web. The lidding web holds the accumulated liquids within the recess of the flap even though the lidding web may be perforated. This is because a nonperforated section of the lidding web, which may be in contact with the liquid, is located adjacent to the recess to hold the accumulated liquids therein.

Another aspect of the invention is a method of bonding a stretched overwrapping lidding web to a tray web with flaps, wherein the lidding web is bonded to the flaps in a substantially horizontal position, and then the flaps are folded and bonded to the tray walls.

Another aspect of the invention is a method of bonding a stretched overwrapping lidding web to a tray web having at least a first and a second flap, wherein the first flap is bonded to the tray wall before the lidding web is bonded to the second flap, wherein the second flap is in a substantially horizontal position. The second flap is then bonded to the tray wall.

Another aspect of the invention is a method of trimming a lidding web from a tray web wherein the tray includes a recess that creates a gap when placed adjacent to a second tray web, and allowing better clearance for a trim device to trim the lidding web from the adjacent tray webs.

Another aspect of the invention is a tray web forming a cavity with vertical walls, wherein a recessed area is formed on a portion of a flange surrounding the cavity. In this manner, a gap is formed from two or more adjacent trays, such that the trim device can properly cut the lidding web bonded to the trays.

Another aspect of the invention is a method of preventing a contaminant from blocking or otherwise interfering with a bonding surface of a tray web by covering the bonding surface with a guard. Contaminants can include debris, particles, dirt, liquids, bits of food, or any other items. In one particular instance, the guard covers the bonding surfaces of the tray flange and the tray sides, such as flaps, during the loading of food items, which were the food item to contaminate the bonding surfaces, may block or otherwise interfere with the integrity of the hermetic seal between the tray web and an overwrapping lidding web bonded to the sides, such as the flaps. In one instance, the flaps are folded within the guard while loading the food item, and may be bonded to the tray web. However, in other instances, after loading the food item in the tray web cavity, the guard is removed and the flaps are debonded, and moved to a horizontal disposition. Thereafter, an adhesive is applied to the flange and flaps and a lidding web is bonded thereto. The flaps may then be folded and bonded to the tray web again.

In another aspect of the invention, a guard for covering the bonding surface of a tray web includes walls to contain the tray web. The guard also includes a portion to cover the tray flange with a portion that extends into the tray cavity, but the guard includes an opening giving access for loading the tray cavity.

Another aspect of the invention is a method of bonding a stretched overwrapping lidding web to a tray web with flaps, wherein the lidding web is bonded to the flanges at two opposing ends of the tray and to two opposing flaps and wherein the flaps are formed with a series of recesses and channels interconnecting such recesses that allow direct communication between the tray cavity and ambient atmosphere via the recesses formed in the flaps.

Another embodiment of the invention is a method for bonding a lidding web to a tray web or any other container, characterized in that the lidding web is tensioned in the longitudinal and lateral direction before the lidding web is bonded to the tray web, or before the lidding web is applied to any bonding agent on the tray web. The lidding web can be stretched longitudinally and laterally. The lidding web can be horizontal at the first instance of contact with the tray web upper surface. The lidding web can be applied to the tray web without additional tensioning or relaxation of the lidding web so as not to cause additional stretching or contraction of the lidding web during application of the lidding web to the bonding agent, so as to prevent smearing of the bonding agent or the formation of creases in the lidding web. In one embodiment, the lidding web can be shaped into an inverted channel before applying the lidding web to the bonding agent on the tray web.

Another embodiment of the invention is an apparatus for bonding a lidding web to a tray web, wherein the apparatus has a plurality of web stretching subassemblies, each web stretching subassembly has a horizontally translatable web gripping subassembly with a pivoting web gripping jaw. The web stretching subassembly can be attached to a timing belt. The web gripping subassembly is attached to a pair of independently actuatable shafts, wherein one shaft operates the web gripping jaw, and the other shaft operates the horizontal motion of the web gripping subassembly. The shafts can have cam followers attached to the distal ends of the shafts, wherein the cam followers ride on the cam tracks and the cam followers follow the cam tracks.

Another embodiment of the invention is a method for tensioning a lidding web in the longitudinal and lateral direction prior to bonding to a tray web, characterized in that the longitudinal tension is applied by gripping the edges of the lidding web with a plurality of web gripping subassemblies, and longitudinally pulling on the lidding web while the lidding web supply is under tension. The lateral tension can be applied to the lidding web by moving the web gripping subassemblies, which grip the edges of the lidding web, apart in relationship to one another. The lateral tension alternatively can be applied to the lidding web by passing the lidding web over a pair of longitudinal members and under a pair of longitudinal members wherein the spacing between pairs diverges along the length of the members, and one pair will terminate ahead of the other, so as to drop the lidding web to a tray web.

Another embodiment of the invention is a method for controlling the transfer of gases from packages and reducing the amount of liquid weep from packages, characterized by overwrapping a tray web containing goods with a lidding web, wherein the lidding web has an area of microperforations adjacent a web tray recess that is in communication with a web tray cavity.

Another embodiment of the invention is a tray having a web with sides and a base to provide a cavity and defining a series of recesses with connecting channels on one side of the web, wherein the channels and recesses provide a conduit for gases from the web cavity to the exterior thereby allowing transfer of the gases and minimization of liquid loss when a second web is bonded at least over the cavity and sides.

The present invention provides numerous advantages. In one instance, the amount of metmyoglobin formed on the surfaces of beef food items is reduced. Other aspects of the present invention increase the throughput of trays in the packaging conduit. For example, by providing a gap between adjacent tray webs, more trays per unit area of conveyor are allowed in the packaging conduit, because the gap allows for the clearance needed by a trimming device, thus averting the spacing of tray webs farther apart on the conveyor. By folding the leading and trailing flaps of trays before entering the packaging conveyor, more trays per unit area of conveyor are allowed in the packaging conduit. By using an enclosed packaging conduit, the need to use a vacuum chamber to provide a controlled atmosphere on a tray-by-tray basis is eliminated.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 14A shows a diagrammatic plan view illustration of an apparatus for applying a biaxially stretched web of material to the upper surface and side walls of a tray web according to the present invention;

FIG. 14B shows a cross-sectional illustration of the apparatus of FIG. 14A;

FIG. 14C shows a cross-sectional illustration of the apparatus of FIG. 14A;

FIG. 14D shows a cross-sectional illustration of the apparatus of FIG. 14A;

DETAILED DESCRIPTION OF THE PREFERRED EMBODIMENT

The aforementioned application PCT/US01/45146, entitled CONTINUOUS PRODUCTION AND PACKAGING OF PERISHABLE GOODS IN LOW OXYGEN ENVIRONMENTS, filed Nov. 28, 2001, is herein expressly incorporated by reference in its entirety for all purposes.

Figure 1:
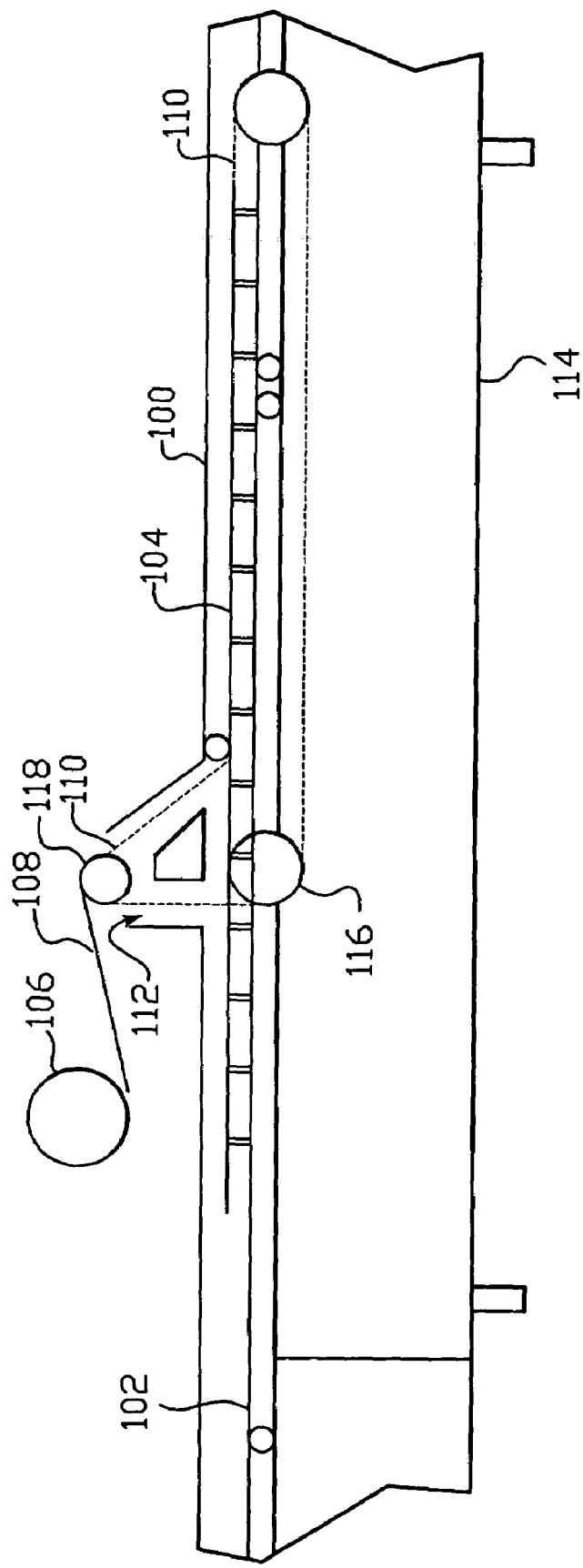
FIG. 1 shows a cross section illustration of a packaging conduit according to the present invention.

Referring to FIG. 1, one embodiment of a packaging conduit includes a frame 114 for carrying the conduit 100. Conduit 100 is substantially enclosed to contain any suitable gas or combination of gases, including carbon dioxide, carbon monoxide, or nitrogen or any liquid thereof. However, in other embodiments, oxygen in any proportions greater or less than that found in air can be used. The packaging conduit 100 includes a conveyor 102 for carrying trays 104 containing perishable food items. Conveyor 102 may include a continuous conveyor section running the length of the entire conduit or may be divided into a plurality of more than one conveyor section. The advantage of having more that one conveyor section is to provide different conveyor speeds. This is useful as will become apparent from the disclosure below to "bunch" adjacent trays together at a desirable location, thus increasing the throughput of the packaging conduit and minimizing the amount of lidding web material used by eliminating scrap lidding sections that would otherwise occur. Conveyor 102 may include a continuous flat belt on which trays 104 rest or conveyor 102 may include cleats or brackets to hold trays 104 in position. Flat, smooth belts may allow the sliding of packages in the manner described to bunch trays in close proximity or adjacent to one another. Alternatively, the tray carrying the conveyor may comprise of a pair of parallel belts, such as 2316 in FIG. 23, each having a cross sectional profile that enhances contact friction and resultant adhesion with the underside of each tray, wherein the pair of belts are spaced apart so as to enable improved tray stability.

Packaging conduit 100 includes first and second gripper chains 110 disposed adjacently on either side of conveyor 102, for at least a portion of the conveyor length. Gripper chains 110 extend along a portion of the conveyor 102 wherein bonding of an overwrapping lidding web takes place. The path traveled of the gripper chains 110 is adjusted by any number of sprockets 116 to direct motion of gripper chains substantially parallel to conveyor 102 or perpendicular or at any desirable angle. The packaging conduit 100 includes a supply of lidding web material 106. Lidding web material is provided in a roll 106 and can be outside of the packaging conduit 100, and openings 112 are provided to allow the passage of lidding web 108 and gripper chain 110 into and out of the packaging conduit 100. Openings 112 can be desirably configured to minimize the escape of any suitable gas within the packaging conduit 100. In one particular instance, gripper chains 110 can take hold of lidding web 108 at either edge thereof at sprocket 118. Gripper chains 110 can apply tension to the lidding web 108 thereto in a transverse direction to the packaging conduit 100. Longitudinal tension may be applied to the lidding web 108 by applying a braking action to the roll of lidding web material 106, while gripper chains 110 pull the lidding web 108 forward. Lidding web 108 is carried into the packaging conduit 100 wherein the lidding web 108 is bonded to surfaces of the tray web 104, including any flange and flaps.

One aspect of the invention is a method of bonding a stretched lidding web 108 to a tray 104 with flaps, wherein the lidding web 108 is bonded to the flaps, while the flaps are in a substantially horizontal position. Once the lidding web 108 is bonded to the flaps, the flaps are next folded and bonded to the tray wall. This operation results in an advantage over other methods that first bond the flaps to the tray and thereafter bond the lidding web to the folded and bonded tray flaps. According to the invention, the lidding web can be tensioned after being bonded to flaps when the flaps are folded into the side locations of the tray.

Another aspect of the invention is a method of bonding a stretched lidding web 108 to a tray 104 having at least a first and second flap, wherein the first flap is bonded to the tray wall before the lidding web 108 is bonded to the second flap, wherein the second flap is in a substantially horizontal position to the tray. In this instance, bonding the lidding web to the first tray flap is optional, since the bond of the lidding web to a tray flange is adequate to provide for hermetic sealing of the package.

Another aspect of the invention is a method of trimming a lidding web 108 from a tray 104, wherein the tray includes a recessed region around the outer periphery of the tray flange. Thus when two or more trays are in adjacent disposition, a gap is formed allowing the proper clearance access to a lidding web trimming device between the adjacent trays. This results in numerous advantages. For example, trays can be spaced closer to one another resulting in less waste of the lidding material and increased throughput on the packaging conduit conveyor so long as there is sufficient clearance for a trimming device to transversely and longitudinally cut the lidding web 108. In one particular instance, the adjacent trays 104 can be positioned so as to be touching or nearly touching any adjacent trays. In this instance, suitable clearance is provided by the gap between trays to allow the trimming device access to trim the lidding web 108 between adjacent trays 104 resulting in very little waste of lidding web material and increased throughput.

A further aspect of the invention is a package assembled from a tray web with flaps with a cavity wherein the lidding web is bonded to the tray and the lidding web includes microperforations at specific locations to minimize the escape of liquids produced by the perishable food item.

A further aspect of the invention is a method of preventing a contaminant from blocking or otherwise interfering with a bonding surface of a tray web by covering the bonding surface with a guard. Contaminants can include debris, particles, dirt, liquids, bits of food, or any other items common to or used in a packaging operation. In one particular instance, the guard covers the tray flange of a tray web during loading of food items, which may block or otherwise interfere with the integrity of the hermetic seal between the tray flange and an overwrapping lidding web bonded to the flange if the food item were to contaminate the bonding surfaces of the flange. In another embodiment, the guard covers the tray sides, such as flaps, of a tray web during the loading of food items that may block or otherwise interfere with the integrity of the hermetic seal between the tray sides, such as flaps, and an overwrapping lidding web bonded to the sides, such as the tray web flaps. In one instance, the flaps are folded within the guard while loading the food item, and may be bonded to the tray web. However, in other instances, after loading the food item in the tray web cavity, the guard is removed and the flaps are debonded, and moved to a horizontal disposition. Thereafter, an adhesive is applied to the flange and flaps and a lidding web is bonded thereto. The flaps may then be folded and bonded to the tray web again.

Figure 2:
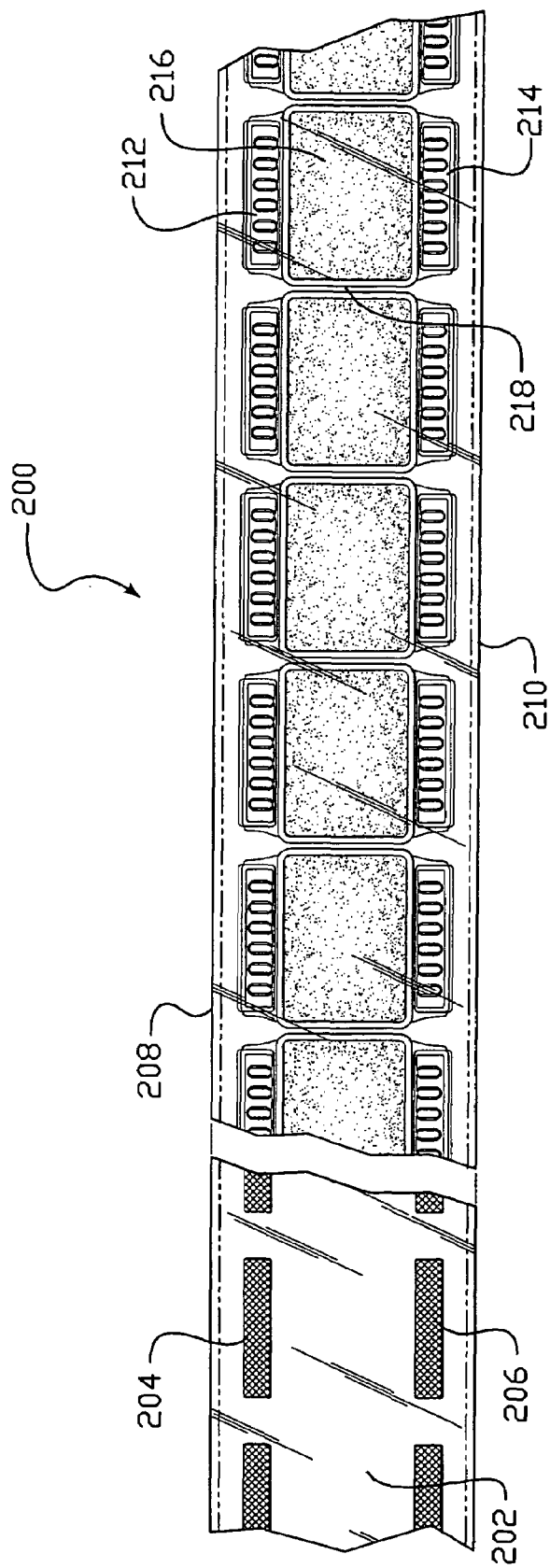
FIG. 2 shows a top plan illustration of a packaging conduit according to the present invention.

Referring now to FIG. 2, one suitable embodiment of a lidding web 202 and a top side view of a packaging conduit 200 is illustrated. It is to be appreciated that while one row of trays for a packaging conduit is illustrated, any number of tray rows can be provided in a packaging conduit, the single tray row being merely one example. In one embodiment, lidding web 202 can include two areas 204 and 206, respectively, placed at opposite edges of the lidding web 202. Areas 204 and 206 can be areas containing microperforations or alternatively and/or additionally can include printed material. However, it is to be readily appreciated that the combination of areas 204 and 206 as shown is merely one example of where microperforations can be placed on the lidding web based on one configuration of a tray with flaps. It is to be readily appreciated that other areas not shown in the figure can also include microperforations, the combination of areas 204 and 206 being an example of one embodiment.

Referring now to the top side view of the packaging conduit 200, a section of the apparatus wherein the two horizontally disposed gripper chains 208 and 210 carry a firmly stretched lidding web therebetween, such as lidding web 202, is illustrated. Lidding web 202 is carried substantially horizontally and directly above a conveyor carrying trays 216 containing food items. In one instance, each tray 216 can have four flaps for side walls; however, by this view, the flaps disposed on the leading and trailing ends of the trays 216 have been bonded to the tray cavity walls and thus they are not shown. Alternatively, the trays 216 can eliminate the leading and trailing flaps and have only the two opposite side flaps 212 and 214. In this instance, a tray flange 218 disposed around the perimeter of the tray cavity will provide sufficient surface area to adequately bond to the lidding web material 202, thus providing a hermetic seal. In either event, flaps 212 and 214 are positioned in a substantially horizontal disposition, which is substantially aligned with the tray flange. Adhesive is applied to the tray flange and flap areas by any suitable application device. Lidding web 202 is then bonded thereto. Following bonding of the lidding web 202 to the tray flange 218 and flaps 212 and 214, adhesive is applied to the underside of flaps 212 and 214, which are then folded and bonded to the vertically disposed side walls of the tray cavity 216. Lidding web 202 can be perforated and/or printed at sections 204 and 206 as required, either before bonding to the tray or in some instances can be perforated or printed after bonding to the tray thereto. Trimming devices will suitably cut the web both longitudinally and transversely. Any remaining scrap lidding web 208 can be discarded or recycled and reused as desired. One particular benefit of bonding the two leading and trailing flaps that come before and after adjacent trays or alternatively eliminating them is that trays may be stacked closer to one another. In this manner, the throughput of trays through the packaging conduit 200 is increased. Another benefit is that the amount of lidding web 202 used per package is reduced because the amount of spacing between trays is also reduced, leading to fewer quantities of scrap lidding web. However, in other alternatives of the present invention, the leading and trailing flaps of the trays may be bonded to a lidding web. Suitable materials for tray webs and lidding webs and methods for making them have been described in the aforementioned PCT application.

It should be appreciated that once the lidding web is applied to any suitable package, the assembled package can further be packaged within a master container, which may contain a plurality of like packages. In one embodiment, the master container keeps the individual packages in a substantially oxygen deficient environment until the individual packages are ready to be shelved for display to consumers, whereas in another embodiment the environment may comprise an oxygen enriched gas blend. While the individual packages remain in the master container there may be exchange of gases from within the individual packages with the interior of the master container. When the individual packages are removed from the master container to the normal ambient atmosphere containing higher quantities of oxygen, the controlled atmosphere within the packages is displaced by air including oxygen. Under some circumstances, the individual packages may not be stored in a master container, in which case, a form of peelable tab can be applied to the area of microperforations to prevent the premature displacement of controlled atmosphere gas. In this case, the tab may be hermetically sealed to the lidding web by suitable adhesives. The tab is pulled just prior to the packages being shelved for consumer display, exposing the microperforations, and initiating the exchange of gas therethrough.

Figure 3:
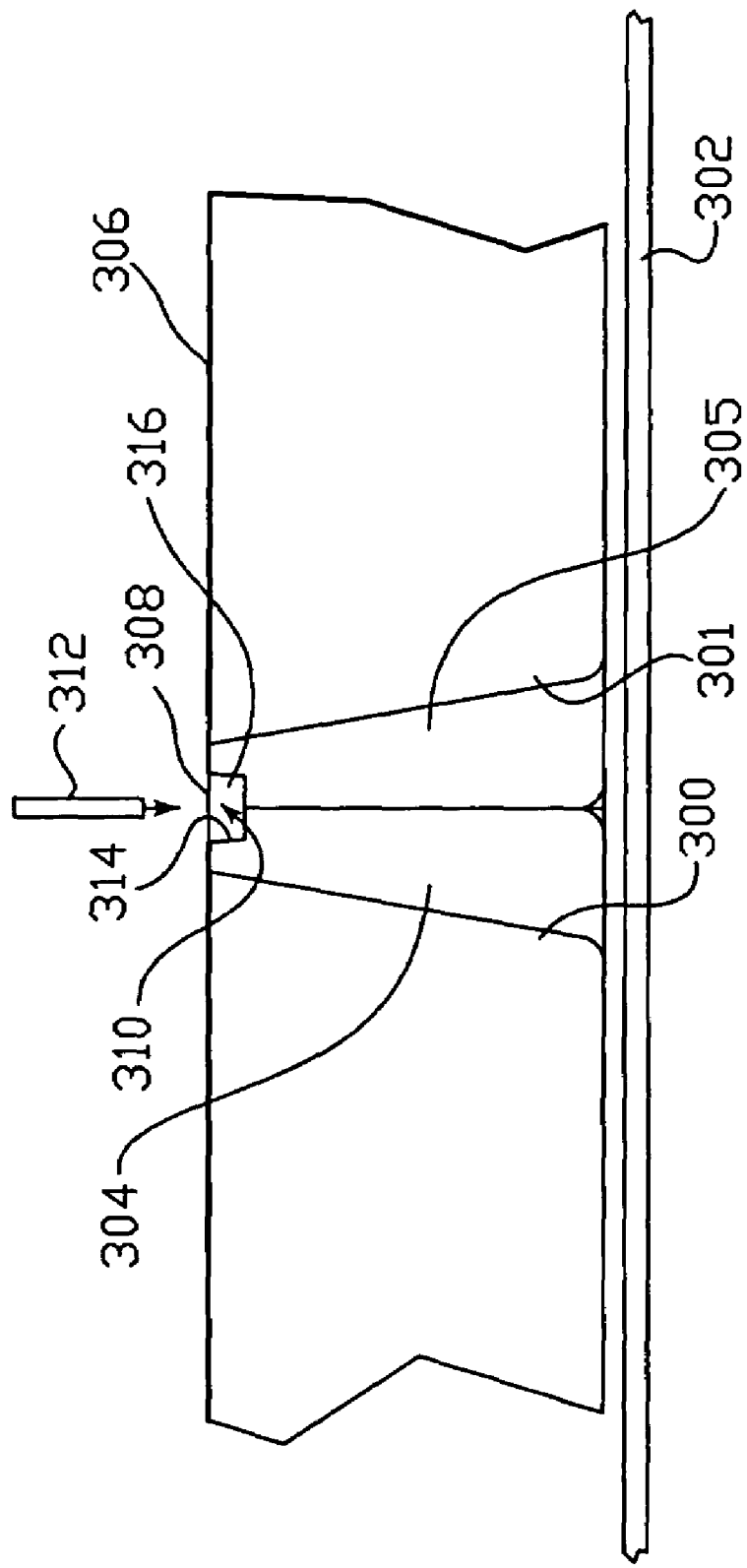
FIG. 3 shows a side illustration of two adjacent tray webs according to the present invention.

Referring now to FIG. 3, one particular aspect of trays to increase the capacity of a packaging conduit is shown. Tray webs 300 and 301 with flaps 304 and 305 are shown in nearly touching or actual touching disposition, wherein flaps 304 and 305 are folded and bonded to trays 300 and 301, respectively, on a wall thereof. Trays 300 and 301 are travelling on the conveyor 302 and can be bunched by providing conveyor runs at varying speeds. For example, a conveyor at a relatively higher speed is followed by a conveyor at a relatively low speed. Flaps 304 and 305 are shown with a gap clearance 310 created by recessing a portion of the outer periphery edge of the tray web at locations 314 and 316, respectively, in flaps 304 and 305. Recesses 314 and 316 may be any suitable shape which when abutted against one another will create the gap 310. Recesses 314 and 316 may be any suitable dimensions to allow a desired trimming device, such as slitter device 312, access to cut the lidding web 308. Gap clearance 310 can be provided at any location where two adjacent trays are in close or touching proximity to one another. In this instance, trays 300 and 301 can be spaced in relatively close proximity to one another while allowing the trimming device 312 ample clearance to operate properly. Benefits provided by the present invention is that trays may be closely spaced to each other on the conveyor 302, thus increasing the throughput of packages through the packaging conduit and reducing the amounts of wasted lidding material.

Figure 4:
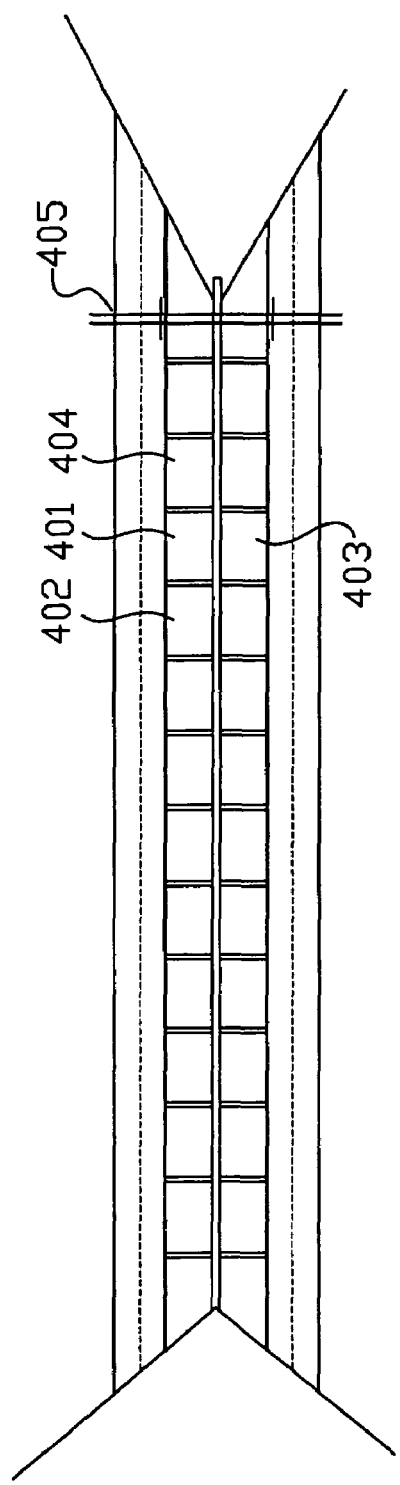
FIG. 4 shows a top plan illustration of a packaging conduit according to the present invention.

One suitable method for creating the recesses 314 and 316 in tray webs 300 and 301 is thermoforming. In thermoforming, suitable molds can be provided which can be arranged as the negative of the eventual tray web. In one instance, raised projections can be provided at a location adjacent to or in close proximity to what will become the outer edge periphery of the tray web or at a portion connecting the tray flange with the respective flaps, such as a hinge. Thus, when ejected from the mold, the projections show up as recesses in the tray web, wherein the recesses appear on what will become the outer edge periphery when the package is assembled. In one particular instance, flaps 304 and 305 have been molded to include a recess running lengthwise and front and back of the trays 300 and 301, such that the recesses 314 and 316 are transversely positioned when the tray is arranged in the packaging conduit 100 of FIG. 1, for example. However, recesses 314 and 316 can be provided around the entire periphery or on three sides for other packaging conduit configurations. For example, in the illustration provided in FIG. 4, two lanes of trays are provided. Therefore, any tray is adjacent to three other trays, and thus in this instance, a suitable tray, such as tray 401 surrounded by trays 402, 403 and 404 can have three or more sides having recesses to allow gap clearances for suitable lidding web cutting devices. In this instance, tray 401 can have a gap clearance along the longitudinal direction as well as gaps provided in the transverse direction. In this manner, trays can be provided closely spaced to each other on the conveyor in two or more lanes while providing ample clearance for cutting device 405 to operate properly. Cutting device 405 can have a plurality of longitudinally oriented blades to cut the lidding web in the longitudinal direction on either side of trays, as well as have a transverse blade to cut the lidding web in a transverse direction before and after adjacent trays.

It is to be appreciated that a twin lane stretch sealing machine as depicted is merely one example of the present invention. It is to be appreciated that one, two or more lanes of trays can be provided on the conveyor, the specific configurations shown in FIGS. 3 and 4, being merely examples of the present invention.

Figure 5:
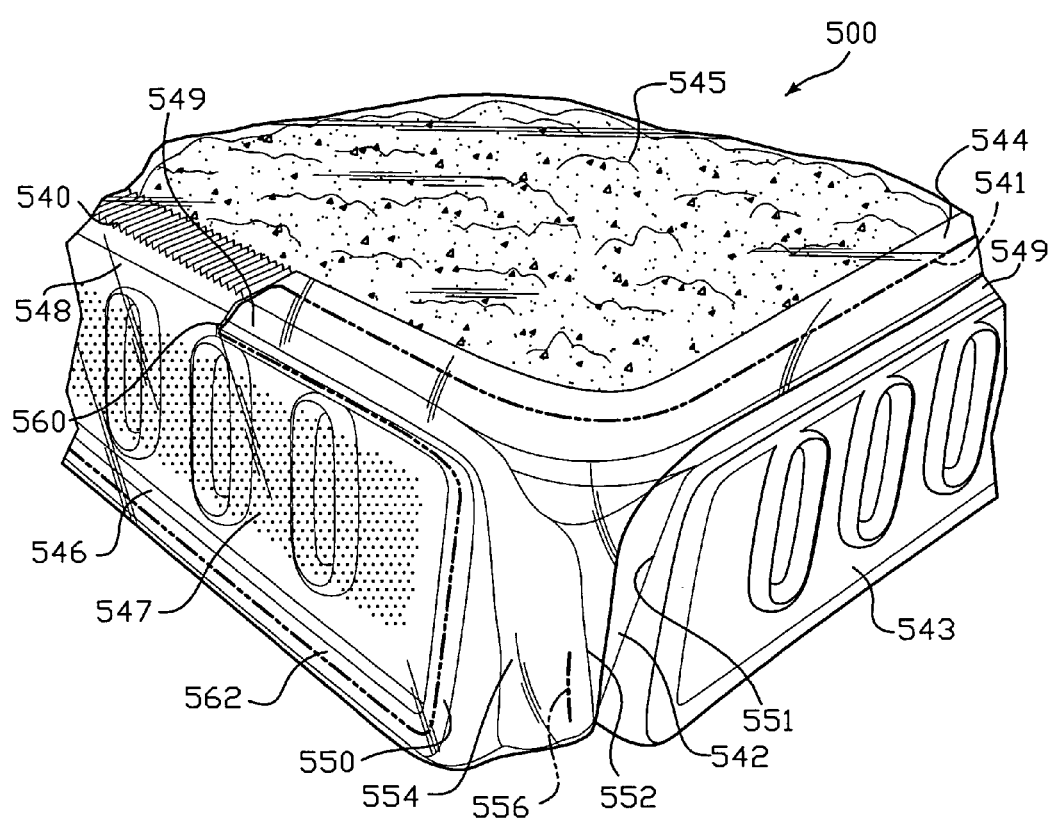
FIG. 5 shows a perspective illustration of a sealed package according to the present invention.

Referring now to FIG. 5, a three-dimensional view of a corner of a tray with flaps constructed according to the present invention is shown. The tray web 500 has been assembled as a completed package with a food item 545, such as ground beef, for example, placed therein. The tray 500 includes a tray cavity, which contains the food item 545. The tray 500 includes a flange 544 constructed around the periphery of the tray cavity. The flange upper surface is generally substantially horizontal. The tray 500 includes a first flap 543 and a second flap 546, attached to the tray flange 544 at a tray hinge 549. While only first and second adjacent flaps are shown, it is to be appreciated that oppositely placed third and fourth flaps 543 and 546 can be similarly configured. The tray 500 includes a communication structure 540, which allows the exchange of gases from the tray cavity to a recessed portion of the outward facing side of the second flap 546. The flap recess is bordered by a raised surface at location 550, which borders the recess 547, but for the area of the communication 548 to allow for free gas passage therethrough. In this instance, the communication 540 includes serrations formed on the tray flange 544, which may extend downward and include the tray hinge 549.

A lidding web is bonded to the tray 500 in the following manner. A bead of adhesive is provided to unite the cavity and the flap recesses as a continuous space closed to the outside with a lidding web. A bead of adhesive 541 is provided at the tray flange 544, such that the adhesive is applied to the upper surfaces of the flange 544. The bead of adhesive 541 continues downward from the communication at location 560. The bead of adhesive 541 is applied to the flap surfaces that border the flap recess 550 at locations 562. While only a portion of the tray with flaps is shown, it is to be appreciated that an adhesive bead is provided in a similar manner on the opposite side of the flap 546 so that when the lidding web is bonded thereto, the tray cavity forms a continuous united space with the outward facing recess on at least one of the tray flaps.

A lidding web 544 is stretched and applied to the adhesive to form a seal between the tray web and the lidding web and the flap and the lidding web. In this manner, a continuous space is created from the tray cavity and the flap recess that is connected via the communication 540. The lidding web is microperforated at the area 547 that is placed adjacent to the flap recess. In this manner, gas exchange can take place at the location of microperforations 547. Gas exchange is further enabled by the serrations 540, which provide for passages from the tray cavity and the flap recess, thus, enabling gas exchange of the tray cavity with the exterior atmosphere, such as is desired before placing the package for retail sale. The area of microperforations 547 may be smaller than the area of the flap recess. Microperforations can begin at a distance above the lowermost edge of the recess, thus leaving a portion of nonperforated lidding web between the lowermost recess edge and the area of microperforations 547. In this manner, any liquids that pass from the tray cavity into the flap recess via the communication accumulate at the bottom of the flap recess and are kept out of contact from the microperforations; therefore the liquid does not weep from the microperforations. The lidding web is bonded to the tray corner with a bead of adhesive 556 that is provided to bond any loose edges 551 and 554 of lidding web to the tray corners.

Figure 6:
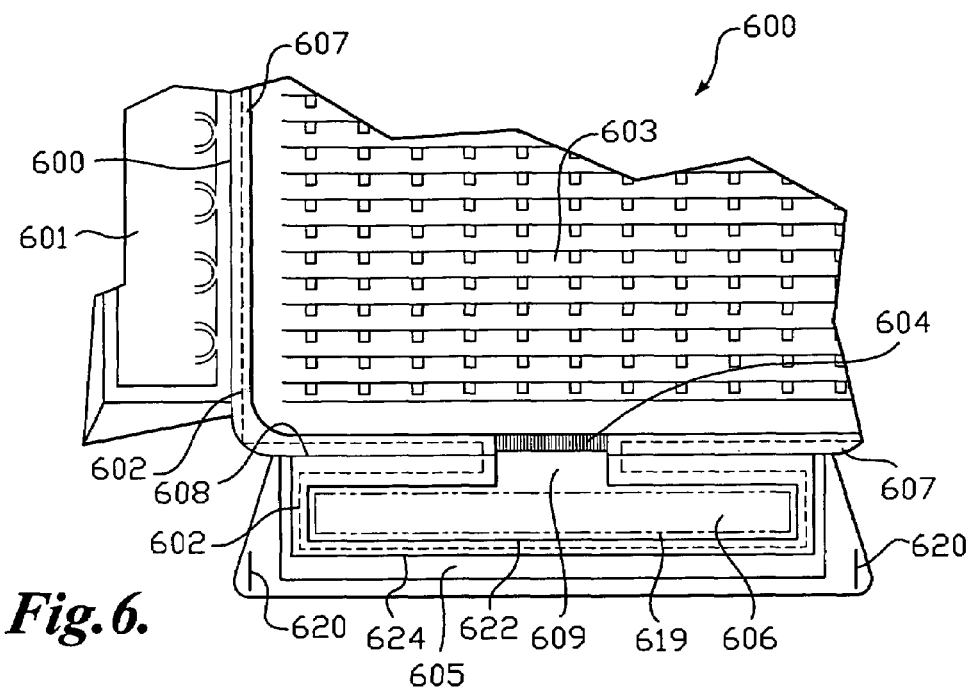
FIG. 6 shows a top plan illustration of a tray web portion according to the present invention.

Referring now to FIG. 6, a top plan view of a section of a tray web 600 with flaps is shown. While only two flaps are shown, one end flap 601 and one side flap 605, it should be readily appreciated that oppositely arranged third and fourth flaps are to be of substantially similar configuration to the flaps shown. A centrally located cavity 603 is enclosed by the four vertically disposed walls of the tray web, only two of which are shown. The cavity is bordered by a flange 607, substantially continuous and flat at all upper surfaces but for the communication structure 604. In the communication structure 604, the flange 607 is provided with serrations 604, which readily allow gases to pass therethrough into a flap recess 606 via an opening passage 609. The flange 607, which extends around the periphery of the cavity 603, is formed from the tray web. Each tray flap is attached to the flange 607 at a respective hinge 608 which allows the flap to be folded in a downward arcing motion in preparation for bonding to the tray walls. Flaps 601 and 605 are shown to be substantially horizontally disposed in relation to the tray and tray flange 607. Flaps 601 and 605 include a centrally disposed recess portion 606 bordered by raised areas. The outermost limit of the recess is shown by the line with the reference numeral 622. The raised border areas are then bounded by line 622 and the line with reference numeral 624; thus line 622 marks the boundary of the recess area 606. The border area is open to the recess area 606 at location 609; thus allowing recess 606 to communicate with the tray cavity 603 therethrough. The raised border area surrounding the recess 606 is substantially horizontal with the flange upper surface while the flap 605 is positioned as shown, and thus the flange 607 and the border areas can be provided with any suitable adhesive. A continuous bead of adhesive is applied along a path 602 including the flange 607 and the flap 605, and the raised border areas surrounding recess 606. The adhesive bead 602 is applied in a manner to unite the cavity 603 and the flap recess 606 into a substantially single space when enclosed by the tray and lidding webs. The spaces created by the cavity 603 and the flap recess 606 are joined by communication 609 and opening 604. The adhesive bead 602 is applied around the communication 604 and 609 and continues to the raised borders of the flap recess 606. The adhesive bead continuous on an opposite side of the communication 604 on flange 607 so as to form a continuous bead of adhesive enclosing the spaces defined by the cavity 603, the flap recess 606, and the communication 604 and 609 between these two spaces. When a web of overwrapping lidding web is applied on the tray and flaps to the adhesive bead, the tray cavity 603 is joined to the flap recess 606 as a continuous enclosed space joined by the communication 604 and 609. Communication structure 604 includes serrations formed on the flange 607, which may extend to the hinge 608 and portion of the flap 605. Flaps 601 and 605 may be bonded to the tray with discontinuous adhesive beads 620 applied at flap corner edges. Likewise, lidding web may be bonded to the flap corners with adhesive beads at locations 620 with discontinuous adhesive beads.

While the particular communication between the cavity and recessed flap area has been shown to include serrations, it is to be appreciated that other methods of establishing communication between the tray web cavity containing the goods and the flap may be used in the practice of the present invention, serrations being one example. It is also to be appreciated that other methods may include apertures from the tray cavity to the flap.

The overwrapping lidding web applied to the tray includes an area shown bounded by the dashed line with reference numeral 619. In one instance, the area bounded by line 619 is microperforated by suitable laser means, for example, such that liquids and any pathogens are restricted from passing therethrough, but gases such as atmospheric oxygen and air can pass directly through the microperforated section into the recess, through the communication at 609 and 604, and into the tray cavity 603. Likewise, any controlled atmosphere packaging gases contained within the cavity 603 can pass through the communication 604 with serrations and opening 609 into the flap recess 606 and out through the microperforated area bounded by the line 619. As can be seen, the area bounded by the line 619 is smaller than the area bounded by 622, the later marking the boundary of the recess area 606. Thus it is advantageous to provide an area between the microperforated area 619 and the boundary of the recess 622 that does not include perforations. In this manner, any liquids which pass into the recess 606 will accumulate at the bottom of the cupped recess (i.e., the nonperforated area between lines 622 and 619). While an area of microperforations has been shown to nearly extend to the boundaries of the recess, it is to be appreciated that the eventual area of the microperforations will be determined experimentally. For instance, the size, number, and the spacing of the microperforations may influence the eventual size of the microperforated area. The area shown here is merely one example of a suitable microperforated area. Furthermore, one or more flaps may include areas with microperforations. In addition, tray cavity walls and flaps may alternatively or additionally be microperforated in any location thereof in accordance with the invention to provide gas exchange without release of liquids.

Figure 7:
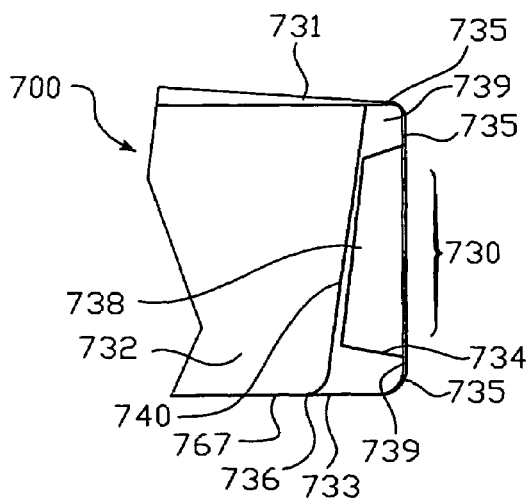
FIG. 7 shows a cross section illustration of tray and lidding webs according to the present invention.

Referring now to FIG. 7, a cross section through a tray web 700 with a lidding web 731 sealed thereto is shown. The tray 700 includes a tray cavity 732 with cavity walls extending upward and substantially vertically or at a small incline from the cavity base 767. It should be readily appreciated that other walls and flaps form the remainder of the tray with flaps, the portion shown in the figure, being merely an example of one suitable flap with recess bonded to a lidding web with microperforations. A flap 733 is bonded to the tray cavity wall by a bead of adhesive applied at location 736. An outward facing side of the flap 733 defines a recess 738. The recess 738 is bounded by raised borders 739. A lidding web 731 is bonded to the tray flange at the upper surface thereof with an adhesive 735. The lidding web 731 is also bonded to the borders 739 surrounding the recess 738 with adhesives 735. Adhesive is therefore placed at locations 735 on an upper surface of the tray flange and at vertical surfaces of the flap adjacent to the flap recess 738 at upper and lower borders 739 thereof. A passage or communication is provided between the tray cavity 732 and the flap recess 738 at the communication 604 and opening 609 as shown in FIG. 6. An area of lidding web 731 denoted by reference numeral 730 includes microperforations. In one instance, the area 730 is spaced a distance from the lower boundary of the flap recess 738 at location 734. In this manner, any liquids that may flow from the tray cavity 732 into the recess 738 are prevented from exiting and the liquids accumulate in the flap recess 738. The liquids are retained within the flap recess 738 by the lidding web 731 that is nonperforated and is located between the lower most boundary of the microperforated area 730 and the lower boundary of the flap recess 734 below location 734. In this manner, liquids are substantially kept away from microperforated areas and prevented from exiting to the exterior of the package. Thus, one advantage of the present invention is the elimination of liquid weep.

Figure 8:
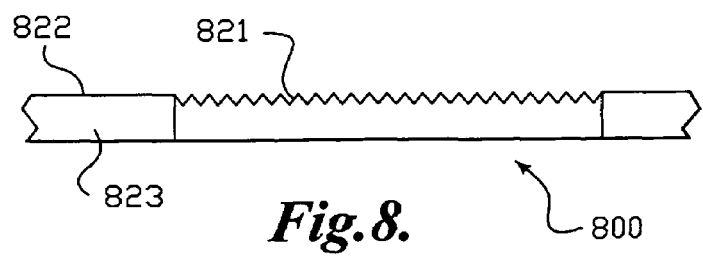
FIG. 8 shows a detailed illustration of a tray web communication portion with serrations between a tray web cavity and a flap recess according to the present invention.

Referring now to FIG. 8, one example of a gas exchange communication structure between a tray cavity and a flap recess is shown. The communication 800 is formed in a tray flange 823. The tray flange 823 is shown to be recessed, wherein the recessed portion can accommodate serrations 821 therein. The serrations can be the full width of the flange 823 or the serrations can be less than the full width of the flange 823 to leave a flat area. The serrations can be located at either the inner edge or the outer edge of the flange 823. The serrations can also continue downward or throughout the thickness of the tray flange 823. The serrations maintain the lidding web 822 from collapse around the communication 800, yet allow the passage of gases therethrough. While one example of gas exchange communication has been shown and described, it is to be appreciated that other communication structures between tray cavities and flap recesses are within the scope of the present invention. For example, numerous communication passages and apertures and other examples of communicating between a tray cavity and a flap recess can be provided.

Figure 9:
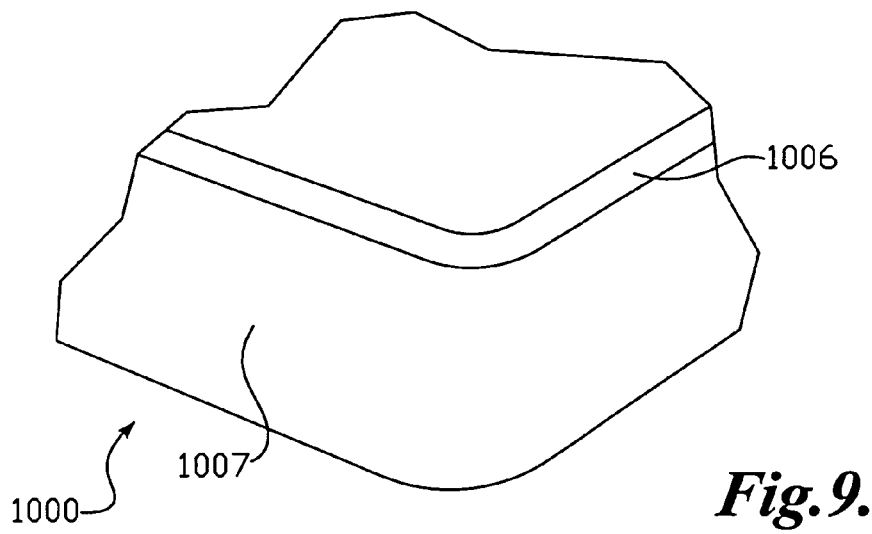
FIG. 9 shows a perspective illustration of a flange guard according to the present invention.

Referring now to FIG. 9, a guard 1000 for covering a tray web is illustrated. The guard is used in preventing a contaminant, such as a food item, from blocking or otherwise interfering with a bonding or sealing surface of a tray web by covering the bonding surface during packaging, including during the loading of the food item within the tray cavity. The guard 1000 includes walls, vertically disposed and connected to adjacent walls at a corner section, thus forming a box like structure having no bottom. While only a first and a second wall are shown, it is apparent that the opposite third and fourth walls are configured similar to the two that are shown. The height and length of guard walls 1007 can be adjusted to coincide with any suitable tray web height and length, including a tray web with flaps. It is also appreciated that the guard 1000 can be configured and adjusted in any manner to contain the tray web with the flaps in a folded disposition, meaning the flaps of the tray web have been placed adjacent to the tray cavity prior to placing the guard on the tray web. The guard 1000 can also be configured to be used while the flaps are in an open disposition, meaning the flaps are not adjacent to the tray web. Upper portions of the walls 1007 extend inwardly and horizontally forming a horizontal shelf 1006 to coincide with the flange of any suitable tray web. The horizontally extending shelf 1006 terminates substantially coextensively with the tray cavity to provide an opening for accessibility to the tray cavity during loading. However, the shelf 1006 may extend further in toward the tray cavity, and in some instances includes a lip that extends into the tray cavity. It is to be appreciated that some amount of misalignment when placing the guard over a tray web can be tolerated, and thus the walls and shelf need not be exactly dimensioned to the tray web.

Figure 10:
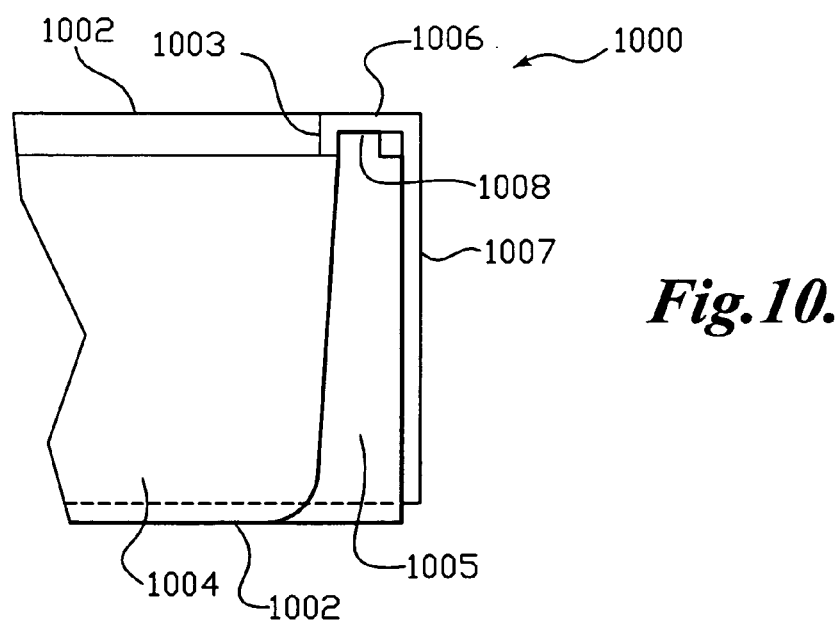
FIG. 10 shows a cross section illustration of a flange guard and tray web according to the present invention.

Referring now to FIG. 10, a cross section of a guard 1000 and tray web 1002 defining a cavity 1004, flange 1008, and flap 1005, is illustrated. Tray web flap 1005 is in close and sometimes firm contact with the internal sides of guard walls 1007. Guard 1000 includes a horizontal shelf 1006 at an upper portion of the guard walls 1007. Shelf 1006 is directed inward from walls and terminates to form an opening 1002 to provide accessibility to the tray cavity 1004 for loading of the food item. Wall 1007 covers flap 1005 at an exterior side thereof during packaging, including loading a food item. Shelf 1006 covers flange 1008 at an upper surface thereof during packaging, including loading a food item. Shelf 1006 includes a lip 1003. Lip 1003 is formed vertically to partly enter the tray cavity 1004. Any amount of protrusion of lip 1003 into the tray cavity is advantageous, as the lip 1003 prevents contaminants from contact with the flange 1008.

If the food item were to spill in the area of the flap or flange bonding surfaces, the spilled food item would block or otherwise interfere with a hermetic seal from being formed thereon. The guard thus prevents spillage of a food item upon the flap or flange bonding surfaces.

Figure 29:
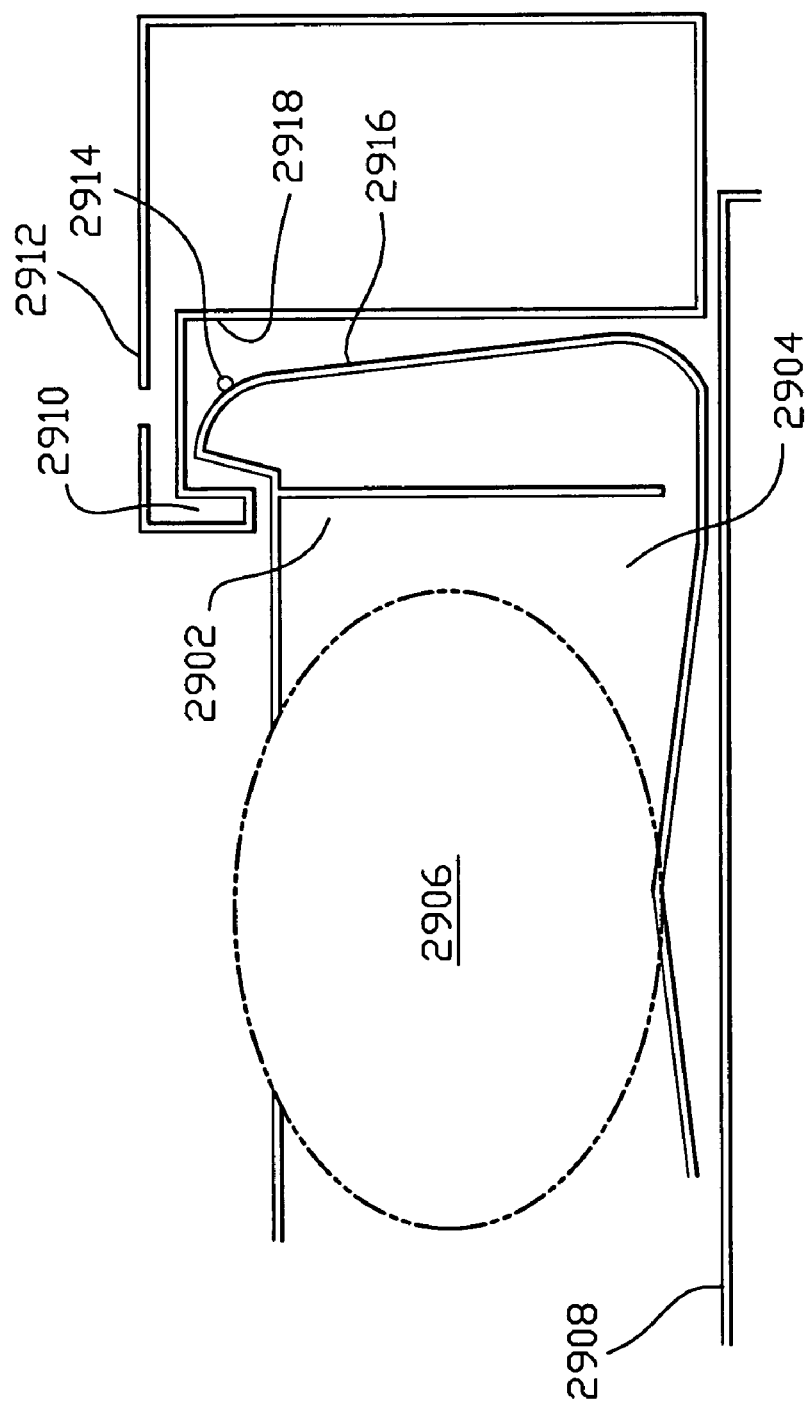
FIG. 29 shows a cross section illustration of a guard and tray web according to the present invention.

Referring now to FIG. 29, a cross-sectional view of a guard 2900 and tray web 2902, defining a cavity 2904 loaded with goods 2906, such as food items, for example, is illustrated. Tray web 2902 rides on conveyor 2908 and the guard 2900 is positioned adjacent to the tray web 2902. The guard 2900 has a horizontal shelf 2912 extending above the tray web flap 2916. The tray web flap's profile follows an arcuate path so that spaces are created between the tray web flap 2916 and the inner surfaces 2918 of the guard walls and horizontal shelf. The horizontal shelf 2912 terminates in a downwardly projecting lip 2910. The lip 2910 extends into the tray cavity and is adjacent the inner upper portion of the tray web flap. In this manner, an adhesive bead 2914 can be located on the exterior of the tray web flap 2916 and the guard 2900 prevents any contaminants from interfering with the bonding agent located on the tray web 2902.

The guard can be made using conventional plastic or metal materials. In one instance, the guard can be made from plastic by injection molding. However, the guard can also be made by thermoforming. The guard is reusable after each use by sanitizing in an appropriate manner. The guard can be manually placed on the individual tray webs during packaging, and before loading of any food items. However, in other instances, the guard can be automatically placed by machine over the tray webs. The guards can be attached to a continuous conveyor, wherein the trays are located within the guard at a first location on the conveyor and the trays are removed at a second location, such as where the trays can enter a stretch sealing apparatus, for example. In one instance, if the tray web includes flaps, the flaps may be folded, and additionally or alternatively bonded to the tray web side walls before placement of the tray web within the guard. In another instance, the flaps can be lightly bonded to the tray web with a spot of pressure sensitive adhesive. In this manner, the tray web size is minimized, rendering the tray web easier to handle. Once the food item is loaded, the guard is removed and the flaps can be opened to a substantially horizontal disposition and an adhesive can be applied thereto and to the flange in the manner described above. A stretched lidding web can then be bonded to the adhesive to create a hermetic seal between the tray web and the lidding web. The lidding web can be microperforated and additionally can include printed material on a portion thereof. Following bonding of the lidding web to the tray web, the flaps may be more rigidly bonded to the tray web.

Microperforation of lidding webs may be performed by lasers. Microperforation of lidding webs can take place before or after bonding to the tray web. Furthermore, printing in the areas of microperforations may also take place with microperforation without hindering the ability of the microperforations to perform as desired. Suitable laser techniques and methods for use in the present invention can be provided by the Rofin Company. Information concerning laser techniques can be located at the Web site http://www.rofin-sinar.com/home-e.htm. Microperforations as small as 0.1 mm (0.004 inch) diameter can be provided by these techniques. Other entities capable of performing suitable microperforations by laser include Laser Machining Inc. of Somerset, Wis. Information about Laser Machining Inc. is available at the Web site http://www.lasermachining.com/company/company.htm. By use of a carbon dioxide laser, microperforations in the range of 40–400 µm and perforation speeds as high as 500,000 holes per second can be achieved. While proportions and methods of providing microperforations have been provided with reference to two makers, it is to be appreciated that other methods exist which can be used in the present invention, such methods can include mechanical methods, such as puncturing the lidding web with pins of suitable diameter. Other methods can utilize high voltage corona discharge. The methods of making herein described being merely examples. Other dimensions of microperforations less than or greater than the dimensions herein described can be used to practice the present invention, the dimensions described herein being examples.

Suitable adhesives for use in the present invention are known as pressure-sensitive adhesives (PSAs). Suitable adhesives are provided by the National Starch and Chemical Company of Bridgewater, N.J. For instance, one example of a suitable adhesive for use in the present invention, known by the trademark DURO-TAK34-449A. DURO-TAK34-449A, is a family of hot-melt pressure-sensitive adhesives designed and qualified for direct food contact. Further information can be obtained from the National Starch and Chemical Company. However, it should be readily appreciated that the adhesive disclosed herein is merely one example of a suitable adhesive for use in the present invention. Other suitable adhesives are well known to those in the art.

There are several advantages to using pressure-sensitive adhesive as opposed to a heat-sealable lidding web. First, PSAs do not require a heating bank. Pressure-sensitive adhesives are thus quicker to apply because they do not require a heating or setting time as is required of heat-sealable materials. Second, by using a packaging conduit for controlled atmosphere packaging, the use of vacuum chambers for individually evacuating each tray of oxygen and substituting a suitable gas is eliminated. Third, the use of pressure-sensitive adhesives eliminate the need to have a heat-sealable layer as part of the lidding web composite. This reduces the amount of scrap material. In some instances, heat-sealable material is not reusable or recyclable, making the use of pressure-sensitive adhesives much more economical and advantageous. If desired however, a heat-sealable lidding web can be used in the present invention.

In one aspect of the invention, a tray is loaded with a food item. The tray is then carried on a conveyor and the flaps are substantially horizontally disposed so as to extend outwardly from the tray walls. The tray web of FIG. 6 described above shows one instance of a tray with horizontally disposed flaps before bonding of the flaps to the tray walls. A suitable adhesive, such as a pressure-sensitive adhesive, is then applied to the flange and to the flaps at locations where desired bonding of the tray web with the lidding web is to take place. Flaps can be supported by supports on the conveyor to substantially stay in a horizontal disposition until desired to be folded and bonded to the tray walls. The stretched lidding web is brought into contact with the pressure sensitive adhesive applied to the flaps and to the tray flange. The lidding web is then severed in a longitudinal and transverse manner, thus allowing the flaps with bonded lidding web thereto to fold in a downward motion. A suitable adhesive is applied, in one instance, on the outside tray cavity walls and the flaps are folded and bonded thereto. In one particular embodiment, the lidding web can be perforated at desired locations such as described hereinabove or additionally or alternatively, the lidding web can be provided with printed material on sides of the tray.

In another embodiment of the present invention, two of the four flaps of a tray, either two ends or two sides, can be selectively bonded to the tray cavity walls without a lidding web bonded to the flaps, while the remaining two flaps left in a horizontal disposition can be bonded to the lidding web followed by severing the lidding web and bonding of the flaps with lidding web to the tray cavity walls. The two flaps that are folded in advance of this step may or may not be provided with a lidding web bonded thereto. In any event, when adhesive is provided to the tray flange, adequate hermetic sealing of the lidding web to the tray occurs even though the lidding web may not extend to the folded flaps. In one particular embodiment, a food tray having four flaps is loaded with a food item. A suitable adhesive, such as a pressure-sensitive adhesive can be applied to the tray flange and the two horizontally disposed flaps. A lidding web having microperforations and printing thereon at specific locations can be stretched and bonded to the tray flange and the flaps. Suitable cutting devices can trim the lidding web both longitudinally and across the tray. The two horizontally disposed flaps are folded in a downward arcing motion and are bonded to the vertical cavity walls. In this manner, by first bonding leading and trailing flaps (FIG. 2), trays are in close and sometimes touching proximity to one another, thus increasing the capacity of the packaging conduit. Since two of the four flaps have been provided with a lidding web, it is convenient to have communication between the tray cavity and the flap recess on one or both of these longitudinal sides.

In further aspects of the present invention, in addition to the lidding web being microperforated, the tray can also be perforated at strategic locations to increase the exchange of controlled atmosphere gas with air including oxygen. For instance, microperforations on the tray web in addition or alternatively to the lidding web, can be located on the tray cavity walls and the flap walls to provide some communication between gases from the tray cavity to the flap recess.

Many variables can be tested to identify a suitable configuration and achieve the desired gas exchange rate. For example, the area, number, and size and placement of microperforations can be increased or decreased to meet the desired gas exchange rates, or any combination of these variables. For instance, these variables independently or in combination can be manipulated so that the level of oxygen within the tray cavity can be elevated from less than or about 0.05% (500 ppm) oxygen to greater than or about 10% (100,000 ppm) oxygen within less than or about 10 minutes.

However, under other circumstances, the level of oxygen within the tray cavity can be elevated from less than or about 0.05% (500 ppm) oxygen to greater than or about 3% (30,000) oxygen within less than or about 15 minutes. The diffusion and gas exchange rates can vary based on a number of variables. For instance, the diameter of microperforations can be adjusted to an optimum, taking into consideration the desired gas exchange rate and the need to reduce the amount of liquid weep. Other variables that may be considered is the amount of free space volume within the tray cavity, the volume of the communication, and the volume of the flap recess. Greater volumes can add to the time for sufficient gas exchange to take place. Other variables, not mentioned here are also considered to affect the gas exchange rate and can be taken into consideration by varying the area of microperforations, the amount of microperforations, the spacing between perforations and the diameter and location of the microperforations, to name but a few examples. These variables can again be determined experimentally to meet the desired application. Other variables, which may or may not be under the control of the designer, may effect the gas exchange, such as temperature, pressure, humidity, air composition, etc., and can be accommodated in the manner described.

Figure 11:
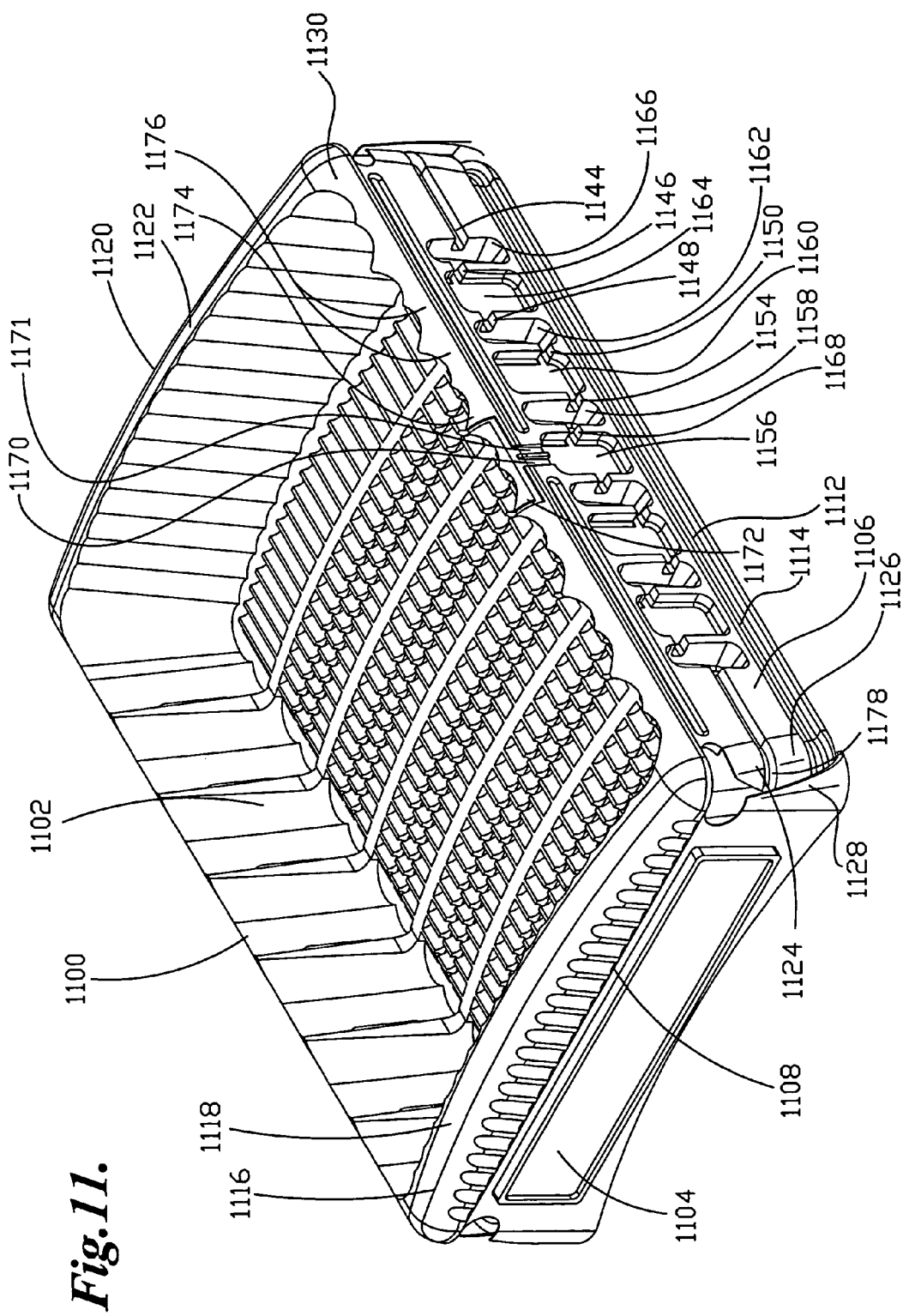
FIG. 11 shows a perspective illustration of a tray web with channels formed into the tray web side walls according to the present invention.

Referring now to FIG. 11 another embodiment of a tray web according to the invention is shown wherein a tray 1100 with cavity 1102 is assembled with an end flap 1104 and side flap 1106 that are hinged at hinges 1108 and 1110, respectively, with corresponding third and fourth flaps on the opposite sides of tray 1100, which cannot be seen in this figure. It is apparent that opposing flaps can be of similar construction to the ones shown. The side flap 1106 is formed with a series of recesses and channels that connect the recesses together in a sequence that will inhibit the escape of liquids, but will allow direct communication of gases there through when a web material has been stretched and sealed to the flap, and in the manner as will be described herein below. Side flap 1106 is formed with a side lower recess 1112 that continues along its full length close to the lower edge of the flap 1106, as seen in FIG. 11. Side lower recess 1112 is formed with a base and sides so that a bead of adhesive 1114 can be extruded and deposited along its full length, or intermittently, or as otherwise may be determined appropriate. The depth of recess 1112 is such that adhesive bead 1114 does not extend beyond its depth. Adhesive bead 1116 is extruded onto the flange 1118 and bead 1120 is extruded onto flange 1122. Additional beads 1124 and 1126 are extruded and applied to flap 1106, and corresponding beads of adhesive are applied to the opposite end of flap 1106, but cannot be seen in the illustration of the tray shown in FIG. 11. Beads of adhesive are also applied to the corresponding locations of the opposing flap on the other side of tray 1100, but this cannot be seen in FIG. 11. A bead of adhesive 1128 can also be applied to the outer ends of flap 1104, and also to the opposite end of flap 1104 as well as to the opposing flap at the corresponding locations. Beads of adhesive in all cases are applied at locations that cannot be contacted by guards or guides that may be used to retain a multiplicity of such trays with adhesive as they are transferred down a conveyor. Such guards and guides would be situated parallel to a conveyor used to transfer the trays, and would therefore not come into contact with the adhesive beads that have been deposited in recessed channels, or at the corners and on the radius of the flanges as shown on the perpendicular side and end planes. A prestretched web of lidding material can therefore be applied with apparatus herein described such that it contacts substantially all of the adhesive beads that will then hold the web securely, which can then be cut appropriately such that the section covering the opening to cavity 1102, the side flap 11064, and the opposing side flap not shown in FIG. 11. The adhesive used may be a pressure sensitive adhesive or other suitable bonding agent as specified herein above, and will hold the stretched web material in position, retaining its tension, the web will conform to the flanges 1118, 1122, 1130 and also the flange of the fourth side opposite to flange 1130, which cannot be seen. The tension will cause the lidding web to conform to not only the flanges, but also to the surfaces of flap 1106 in contact with lidding web.

Figure 13:
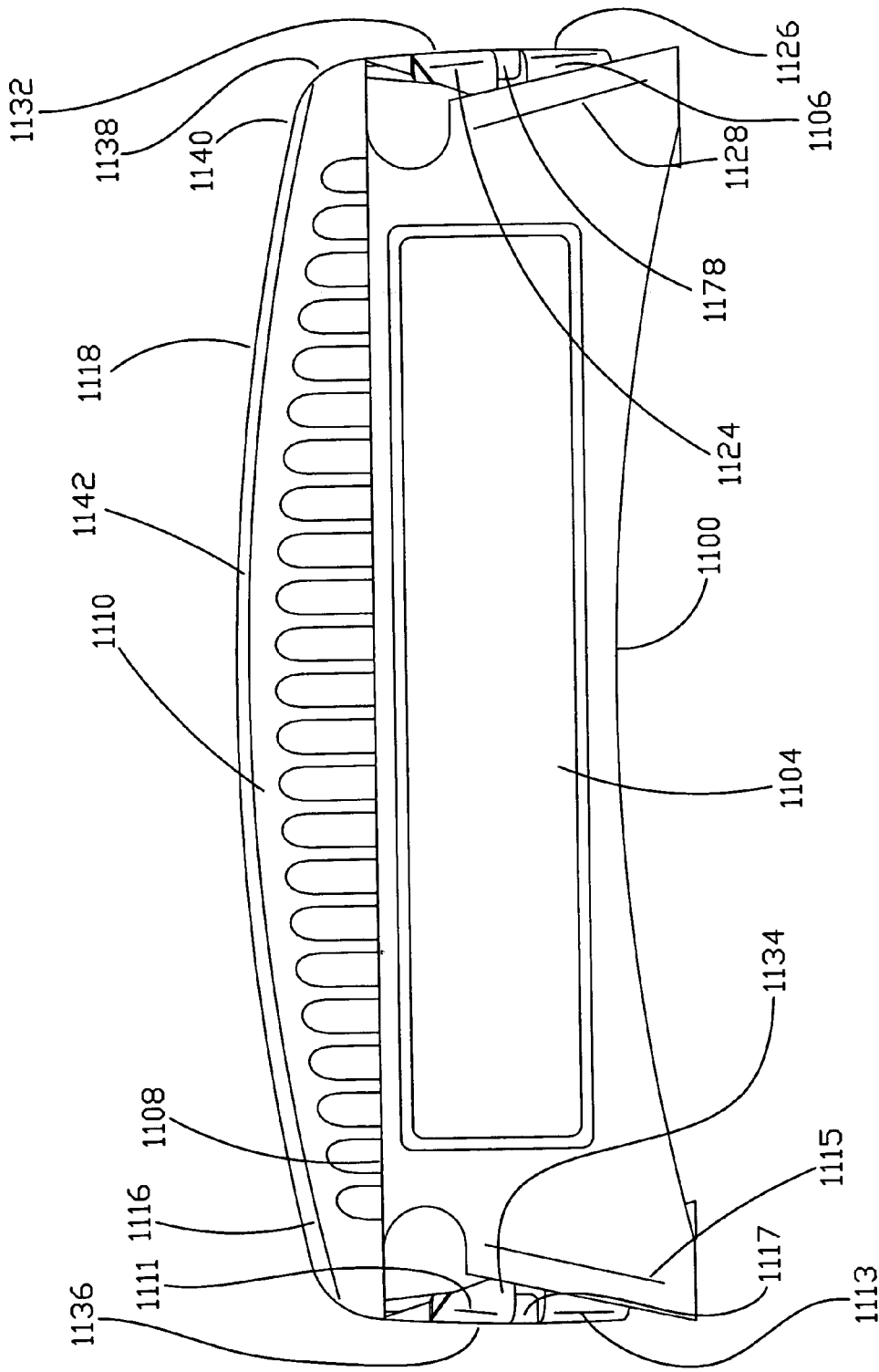
FIG. 13 shows an end view illustration of a tray web according to the present invention.

Referring now to FIG. 13, which shall be detailed additionally below, the surface of flap 1106 at surface 1132 and opposing flap 1134 at surface 1136 have an arcuate shape that continues in a substantially continuous line from the base of one flap, upwardly around the surfaces 1138, 1140, and 1142, and across the entire package to radius 1136. This configuration provides for conformity of the stretched web to those exposed surfaces around the recesses and channels, formed into flap, such as flap 1106, and the corresponding opposite flap 1134.

Referring again to FIG. 11, channels 1144, 1146, 1148, 1150, 1154, and 1168 connect recesses 1156, 1158, 1160, 1162, 1164, and 1166 together. The series of channels and recesses ends in channel 1144 that is open to the outside. It can therefore be seen, after application of a web of material that has been bonded to an adhesive, gas or ambient air can freely follow the channels and the recesses, and connect to channels 1170, 1171, 1172, and 1174 directly into the cavity 1102 of tray 1100. Channels 1172 and 1174 are formed into the peaks on the inner facing side wall of tray web. It can also be seen that channels 1148 and 1150, for example, are arranged at different locations, i.e., at different heights. Differing channel height is provided to inhibit the escape of any liquids that may be present in cavity 1102 after packaging. For example, if a finished package comprising tray, ground beef contents, and a stretched web lidding material fully assembled, is turned onto a side, any liquids that may be present will firstly fill recesses 1176, formed into the inner facing side of the tray side walls. Assuming that there is sufficient liquid present so as to fill recesses 1176 to such a level that liquid may enter channels 1172 and 1174, the liquid would then flow into recess 1156 via channels 1170 and 1171, and most likely be retained in recess 1156 or in any of the recesses extending outward from recess 1156. The end of channels 1144 and 1178 are exposed to atmosphere, but the opening is located at a different plane to the outer surface of flap 1106, and therefore for any liquid to escape from the package through channels 1144 and 1178, all recesses would need to fill with such liquid up to the level of the opening of channels 1144 and 1178. However, the package will have to experience all sorts of twisting and turning such that liquid will escape from a plane different from the flap plane. However, gases will be capable of communicating from the outside of the package to the inside of cavity 1102 freely. It should also be noted that during the normal handling of a finished package that is constructed in the manner herein described, will result in a partial squeezing of the tray vertical side walls and stretch web material, toward each other. Such an action will cause elevation of internal gas pressure, therefore expelling some gas along the channels 1144 and 1178. After gas has been expelled in this manner and the package is released, the tray sides will relax to their normal position and cause a lowering of gas pressure within cavity 1102. This will then cause gas such as ambient atmosphere, to be drawn along channels 1144 and 1178 and toward cavity 1102. This "bellows" action will enhance the transfer of gases from within cavity 1102 to ambient atmosphere, and vice versa. Gas will also diffuse more rapidly along the referenced channels and allow more rapid exchange of atmospheric oxygen with gases in cavity 1102, and therefore facilitate the more rapid generation of oxymyoglobin at the surface of any meat contained therein.

Figure 12:
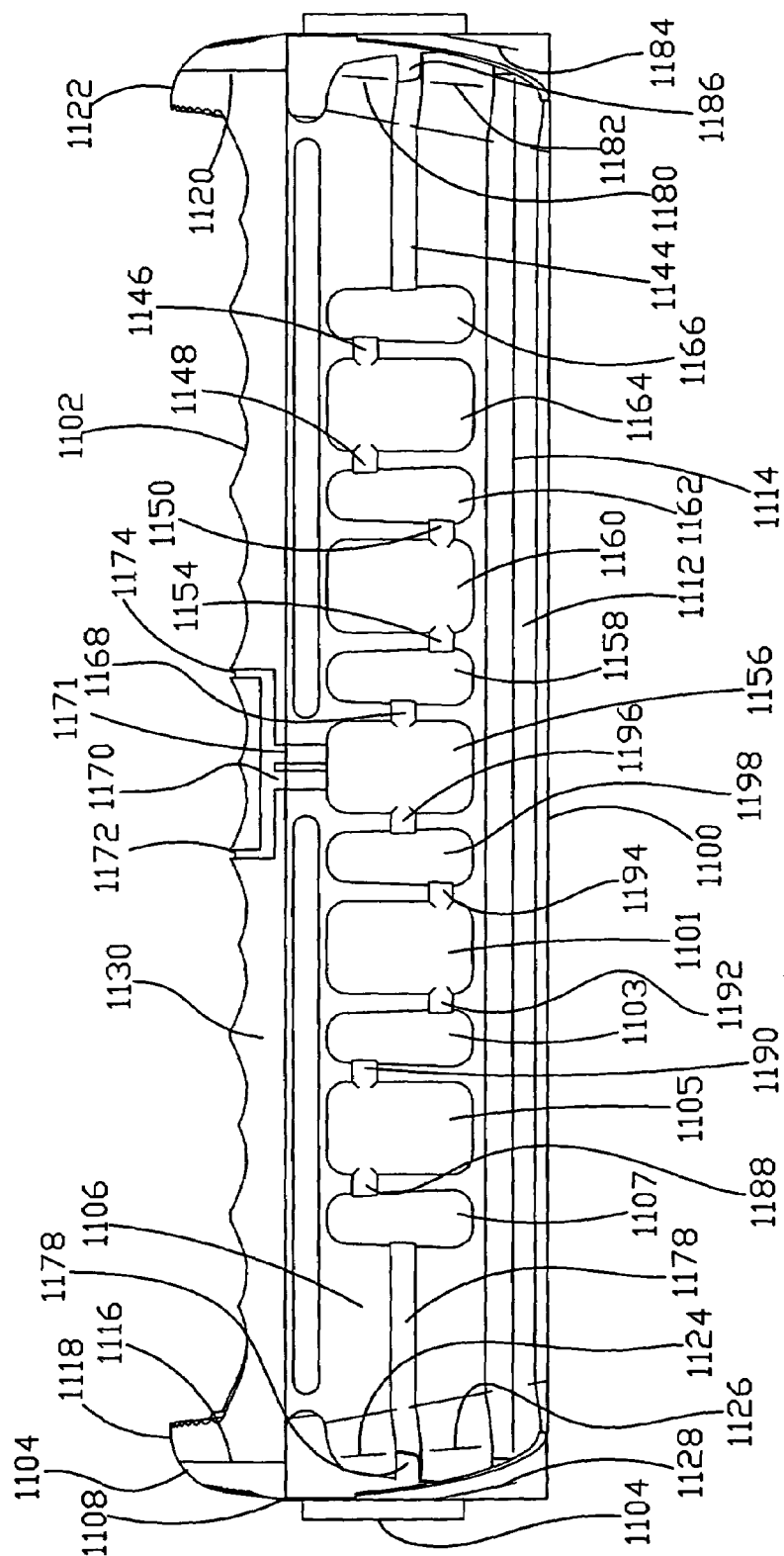
FIG. 12 shows a side view illustration of a tray web with channels formed into the side walls according to the present invention.

Referring now to FIG. 12, a side elevation of the tray as described in association with FIG. 11, is shown. Adhesive strips 1116, 1124, 1126, 1114, 1128, 1120, 1180, 1182, and 1184 are shown conveniently located so as to provide secure bonding of a stretch web material that is applied thereto. It should be apparent also that material not capable of stretching but nevertheless can be put under tension both longitudinally and laterally, can be used in practicing the invention. A clear detail of channels 1144, 1146, 1148, 1150, 1154, 1168, 1170, 1171, 1172, and 1174 are shown connecting recesses 1156, 1158, 1160, 1162, 1164, and 1166 together to provide a passageway that will allow gases to pass from point 1186 via all channels and recesses, and to enter at the tray cavity 1102 at channels 1172 and 1174. Channels 1178, 1188, 1190, 1192, 1194, and 1196 are shown connecting recesses 1156, 1198, 1101, 1103, 1105, and 1107 together to provide a passageway that will allow gases to pass from point 1178 via all channels and recesses and to enter at the cavity 1102 at channels 1172 and 1174. It can be seen that a stretched web of material that has been applied to the adhesive will enclose cavity 1102 and the channels and recesses, leaving only openings 1178 and 1186 to communicate directly with ambient atmosphere from tray cavity 1102.

Referring now to FIG. 13, an end view of the tray is shown with adhesive strips shown at 1116, 1124, 1126, 1128, 1111, 1113, and 1115. Openings 1178 and 1117 are therefore provided when a stretched web of material is applied and bonded to the adhesive strips.

Referring now to FIG. 14A, a plan view illustration and cross section illustrations of a lidding web stretching and packaging apparatus is shown. The views shown give detail of a web stretching apparatus that is arranged to apply a stretched web of material to trays similar to those described in association with FIGS. 11, 12, and 13, thereby bonding the stretched web of lidding material to an adhesive or bonding agent applied to the tray, generally as described in association with FIGS. 11, 12, and 13. FIG. 14B, FIG. 14C, and FIG. 14D show detail of cross sections through the web stretching apparatus at various locations along its length.

Referring to FIG. 14A, a web of lidding material 1202 is gripped at each side edge by a pair of gripping chains 1204 and 1206, and continuously carried forward by the chains. The lidding web 1202 is unwound from a roll 1208 of source material. The roll 1208 is mounted on a device having a braking mechanism to apply longitudinal tension on the web as the web is pulled forward. As the web is carried forward the web engages with two outer cords and two inner cords. The web 1202 is laterally stretched between the series of outer and inner cords 1210, 1212, 1214, and 1216. Longitudinal stretch in web 1202 is induced by applying a controlled brake to the roll 1208 of material from which web 1202 is unwound so that the speed of roll 1208 is slower than the speed of the chains 1204, 1206. Web gripping chains 1204 and 1206 apply tension thereby inducing a longitudinal stretch to a controlled extent of, for example, 10%, but not exceeding 20%, by carrying the web forward. Lateral stretch is induced by increasing the distance between the gripping chains 1204, 1206, and the cords 1214, 1216. Gripping chains 1204 and 1206, as well as cords 1210, 1212, 1214, and 1216, are constructed as endless devices to accommodate continuous processing. Cords 1210, 1212, 1214, and 1216 and chains 1204 and 1206 are also driven by variable speed driving motors, which are not shown. The web of lidding material 1202 and the stretching assembly are located directly above a suitable conveyor 1202 carrying loaded trays, such as 1218 and 1220, which can be similar to those trays described in association with FIGS. 11, 12, and 13. The cords 1210, 1212, 1214, and 1216 are driven at a relatively equal and constant speed as is the conveyor carrying the trays. The cords are retained in a vertical disposition as shown in FIG. 14D. FIG. 14D shows endless cord 1210, for example, held captive by retaining bar 1222 and a pivot 1224. Cord assembly, comprising cord, bar, wheels, and pivots, has a lower and upper run of cord 1210 trained on two wheels located on either end of the bar 1222 to which the cords are trained in an endless loop. A wheel is driven by a suitable variable speed driving motor so as to drive cord 1210 in the required direction, and at any velocity that is selected.

Referring to FIG. 14B, it can be seen that gripping chains 1204 and 1206 grip web 1202 at its lateral edges. Cords 1214 and 1216 are below the web 1202 and cords 1210 and 1212 are above the web 1202. The web is being laterally stretched over and below the cords as the cords are spaced relatively further apart from each other and from chains 1204 and 1206, while the web 1202 is held at its edges by gripping chains 1204 and 1206. As the web 1202 is carried forward by gripping means 1204 and 1206, the cords 1210, 1212, 1214, and 1216 are in contact with and will stretch web 1202. It is to be appreciated that rigid or semi-rigid web materials may undergo little or no stretching. Moreover, even these materials can be put under longitudinal and lateral tension with the apparatus of the present invention. As can be seen in FIG. 14A, web edge gripping means 1204 and 1206 and cords 1210, 1212, 1214, and 1216 converge inwardly toward the longitudinal center of the apparatus. As gripping mechanisms 1204 and 1206 converge, cord assemblies 1210, 1212, 1214, and 1216 follow a parallel path inwardly toward the center. As the cords and gripper means converge, cords 1210 and 1212 are angled downwardly and cords 1214 and 1216 are angled downwardly to bring the lidding web closer to the trays. The downward angle of cords 1214 and 1216 and the downward angle of cords 1210 and 1212 are arranged to provide a lateral stretch in web 1202, and simultaneously alter the profile of an initially flat web 1202 to that of an inverted channel as shown in FIG. 14C. Cords 1214 and 1216 terminate at locations 1226 and 1228 along the conduit, respectively; thereby allowing stretched web 1202 to come in contact with the upper surface of the trays.

Referring to FIG. 14C, a base 1230 and cover 1232 comprise a section of a conduit to enclose a section of the web stretching apparatus wherein the stretched web 1202 has been applied by allowing cords 1214 and 1216 to terminate. Thus, web 1202 is allowed to fall to the upper surfaces of tray 1234. Web 1202 is now in contact with the upper flanges of tray 1234. However, cords 1210 and 1212 are still in contact with the web 1202 on opposing sides thereof and are at a spaced distance to hold the web 1202 away from contact with the tray sides. The web 1202 continues to be gripped at each edge by gripping means 1204 and 1206. Rollers 1236 and 1238 located on opposing sides of the conveyor are provided to apply pressure in the direction shown by arrows adjacent thereto, and cause web 1202 to contact the sides of tray 1234. Rollers 1236 and 1238 can be arranged so as to depress web 1202 into the recess 1112, shown in FIG. 11, and to cause contact and therefore bonding of web 1202 to adhesive 1114 located in the recess. After bonding web 1202 to tray 1234, the trays are separated from the web.

Figure 15:
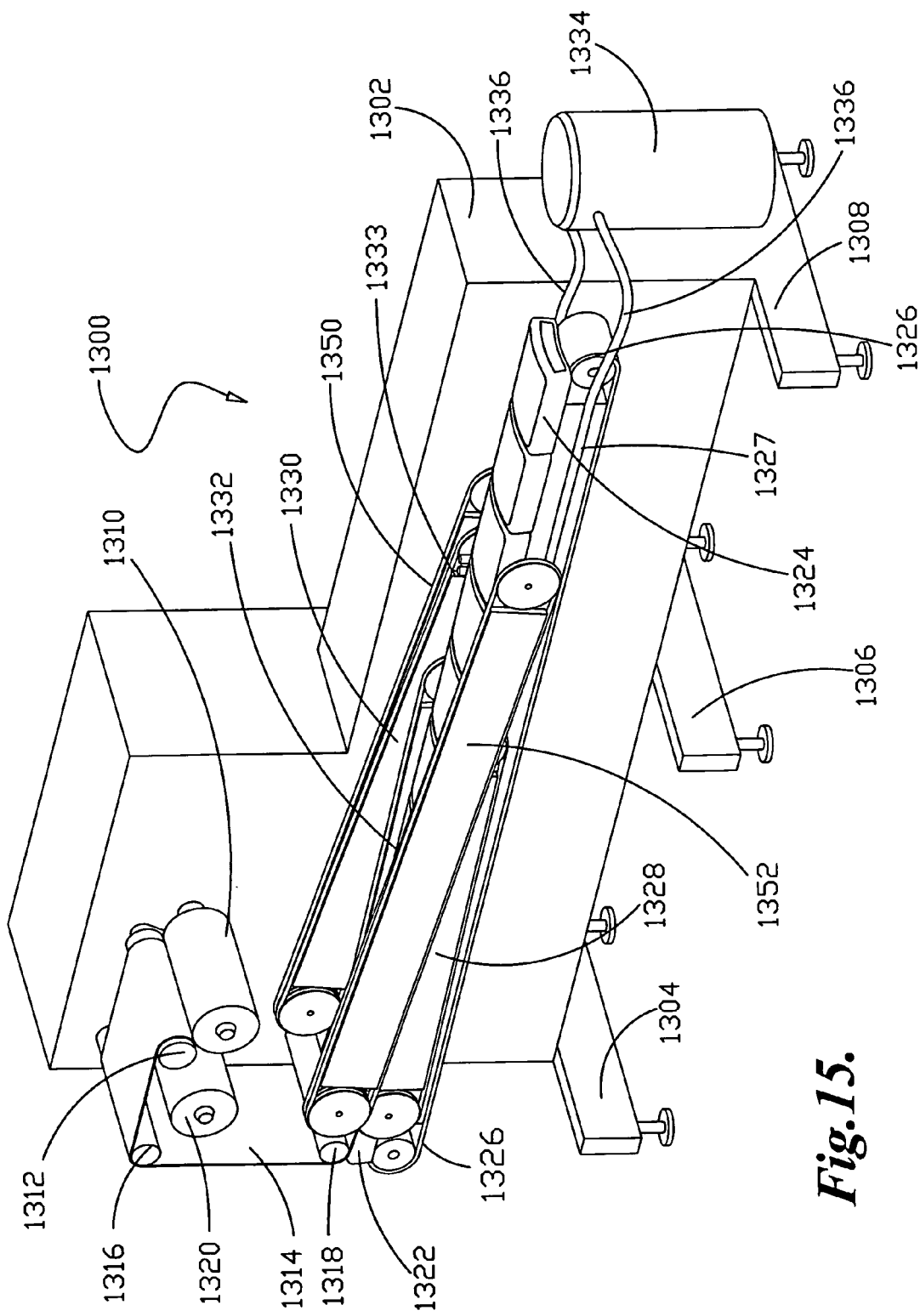
FIG. 15 shows a perspective illustration of an apparatus for applying a biaxially stretched web of material to the upper surface and side walls of a tray web according to the present invention.

Referring now to FIG. 15, an illustration of an apparatus 1300 for biaxially stretching a web of material and applying the web to trays, as described in association with FIGS. 11, 12, and 13, is illustrated. The apparatus includes a frame 1302 supported by adjustable legs 1304, 1306, and 1308. An assembly of rollers is located at an upper location on the frame 1302. A roll of web material 1310, such materials being described in PCT/US01/45146, for example, is located at an upper location on the frame 1302. A suitable lidding web material is plasticized polyvinyl chloride "pPVC", which is capable of stretching and has memory, i.e., can expand under tension and then contract once the tension is removed. However, semirigid materials, including biaxially oriented polyester can be used in the invention. One feature of the apparatus is that it does not substantially allow further tensioning or relaxation of the initial tension applied to the lidding webs until only after bonding the lidding webs to the trays. By not allowing additional tensioning or relaxation of tension, the lidding webs are not allowed to undergo further stretching, which could result in smearing of the bonding agent that may lead to failures of the hermetic seal, or if tension is relaxed, lidding webs may undergo contraction that may lead to creases in the web, an unattractive appearance to consumers. A drive roller 1312 is located adjacent to the roll of web material 1310. The drive roller 1312 unwinds the web material 1314 as it travels over idler rollers 1316 and 1318. Additionally, or alternatively, a second lidding web material 1320 can be laminated to the first material of roll 1310. The lidding material 1314, whether single or multi-ply material, travels underneath idler roller 1318. From idler roller 1318, the lidding material 1314 is captured at its edges by gripping means, such as gripping chains 1350 and 1352. Gripping chains 1350 and 1352 are positioned on opposite sides of the lidding material 1314. The gripping chain can be trained on a longitudinally extending structure assembly wherein the chains glide over upper and lower surfaces thereof. Gripper chains can be trained on sprocket wheels located on either end of the longitudinal structure. One sprocket wheel may be a drive sprocket where the opposite sprocket is an idler sprocket. A stream of trays, such as 1322 and 1324, are carried on a conveyor belt 1326 at any suitable speed. Conveyor belt 1326 has a base platform 1327 supporting the conveyor belt 1326. Conveyor belt 1326 can be connected a variable driver (not shown). The speed of conveyor belt 1326 can be adjusted via the driver.

Outer right cord assembly 1330, outer left cord assembly 1332, inner left cord assembly 1328, and inner right cord assembly 1340 that cannot be seen are arranged such that web 1314 engages with the cords, and is stretched as it is carried forward.

In one embodiment, a vacuum chamber 1334 is attached to conduits 1336 that are located so as to carry any scrap lidding material that has been cut and separated from the continuous lidding material 1314 by a suitable cutting means 1333.

Figure 16:
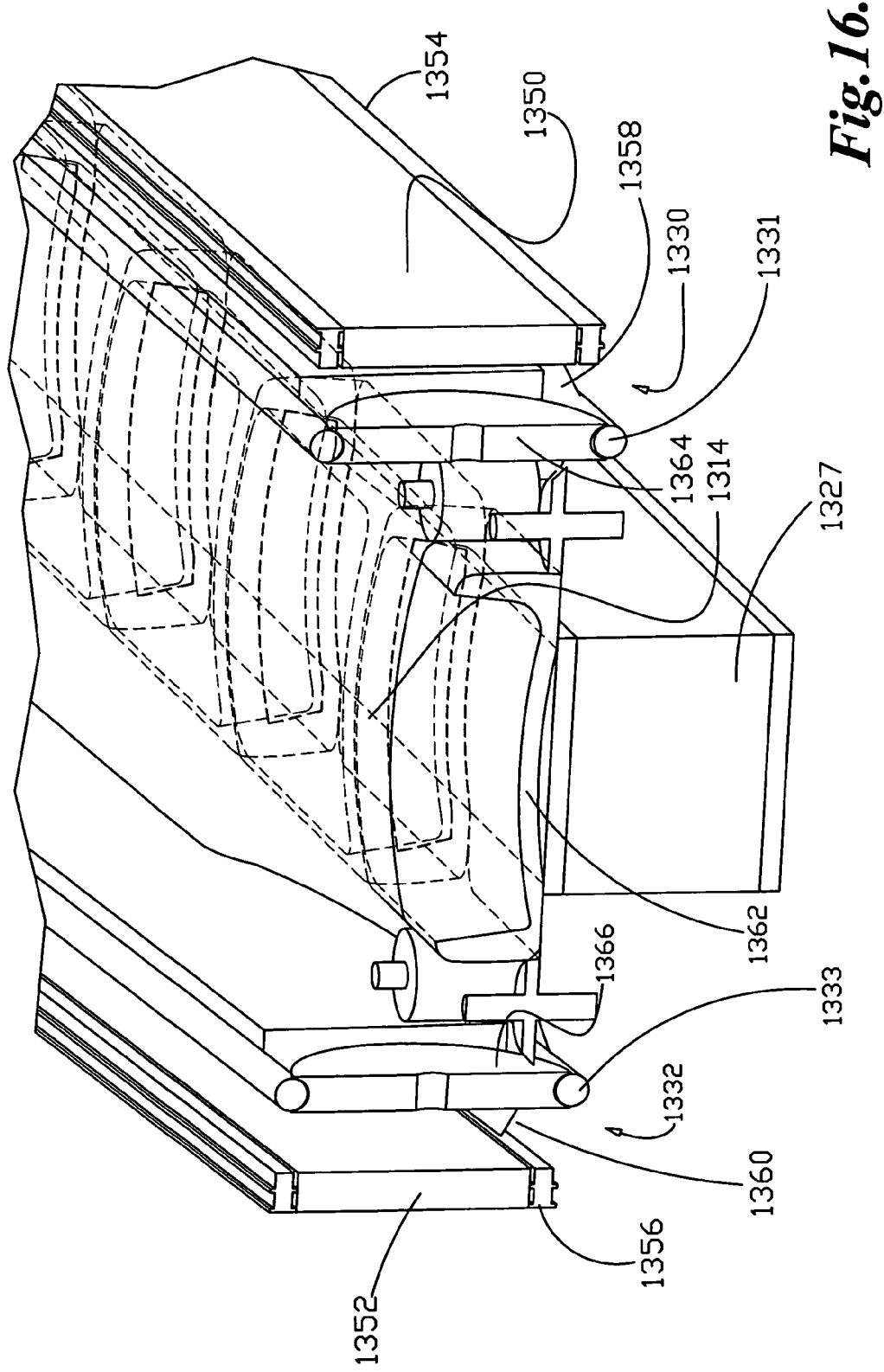
FIG. 16 shows a cross section illustration of the web stretching arrangement in an apparatus for applying a biaxially stretched web of material to the upper surface and side walls of a tray with channels formed therein according to the present invention.
Figure 17:
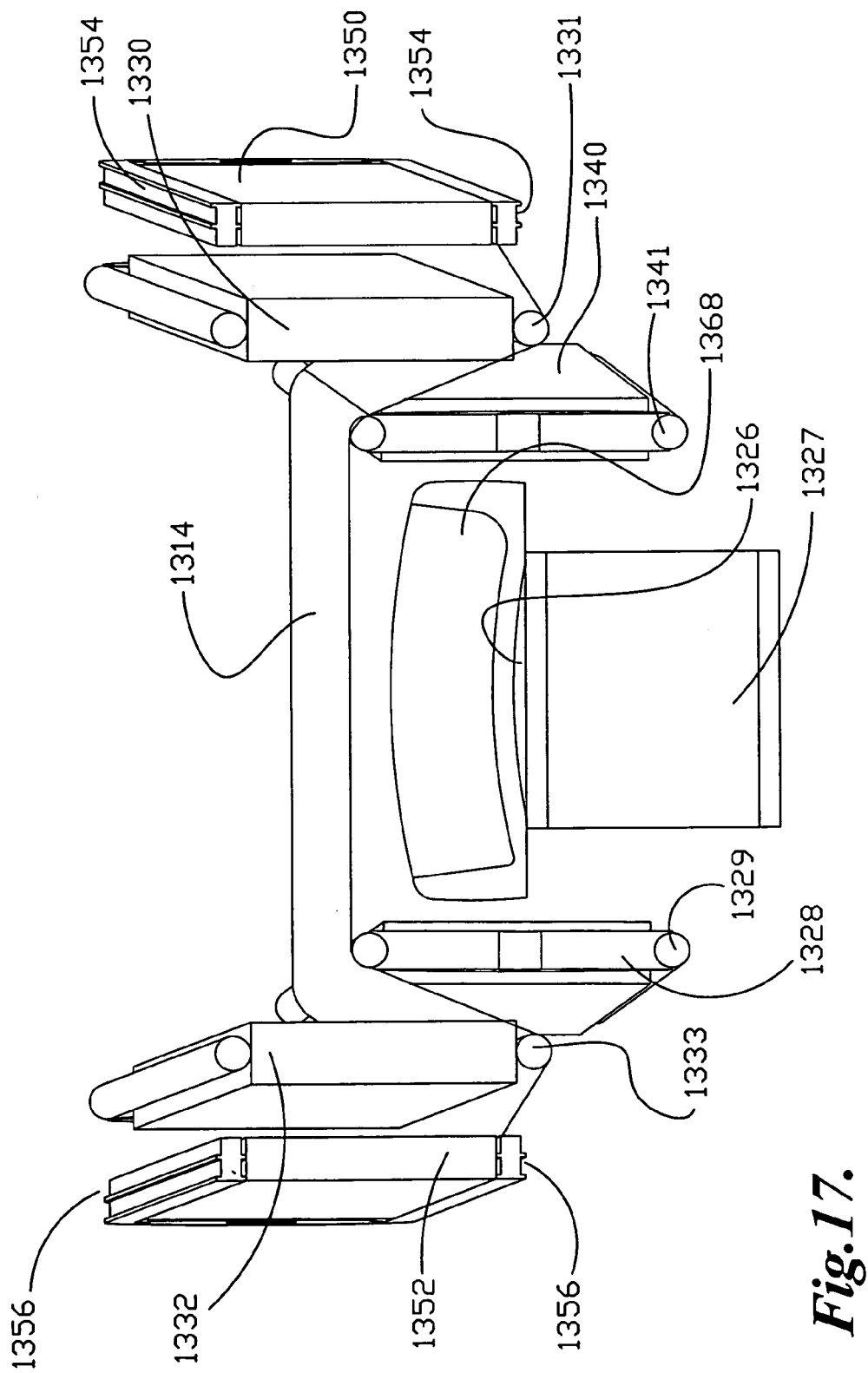
FIG. 17 shows a cross section illustration of the web stretching arrangement in an apparatus for applying a biaxially stretched web of material to the upper surface and side walls of a tray web according to the present invention.

Referring now to FIGS. 16 and 17, cross-sectional illustrations of the apparatus of FIG. 15 are illustrated. FIG. 16 shows a cross section of the packaging conduit after the inner cord assemblies have terminated and only the outer cord assemblies 1330, 1332 remain, while FIG. 17 shows both inner 1340, 1328 and outer 1330, 1332 cord assemblies. Cord assemblies are seen more clearly comprising an elongated bed, wheels, and cords supported by the bed, and trained on the wheels at either end of the elongated beds. Referring to FIG. 17, the conveyor platform 1327 and belt 1326 are shown carrying trays. Outer cord assemblies 1330 and 1332 are located alongside the conveyor 1326 on either side of a tray. Inner cord assemblies 1328 and 1340 are angled downwardly as the cord assemblies are arranged alongside the conveyor 1327. Cord assemblies 1328 and 1340 are fitted with endless cords 1329 and 1341. Cords 1329 and 1341 endlessly revolve on cord assemblies 1328 and 1340, respectively. Cords 1329 and 1341 are driven by any suitable driver. Outer cord assemblies 1330 and 1332 carry a second set of cords 1331 and 1333, respectively. Outer cord assemblies 1330 and 1332 are angled downwardly as cord assemblies 1330 and 1332 travel alongside the conveyor 1327. Cords 1331 and 1333 endlessly revolve on cord assemblies 1330 and 1332, respectively. Cords 1331 and 1333 can be driven at any suitable speed by drivers (not shown). Lidding material 1314 is moved forwardly by gripper chain assemblies 1350 and 1352 gripping the respective opposite edges of lidding material 1314. Gripping chain assemblies 1350 and 1352 have suitable gripper chains 1354 and 1356 that hold the edges of lidding material 1314. Gripping chains 1354 and 1356 can be trained in an endless fashion about gripping structure assemblies 1350 and 1352, respectively. Gripping chains 1354 and 1356 endlessly revolve on gripping assemblies 1350 and 1352, respectively. Gripping chains 1354 and 1356 can be driven at any suitable speed. From the gripping chains 1354 and 1356, lidding material 1314 is in contact with the lower runs of cords 1331 and 1333 of the outer cord assemblies 1330 and 1332, respectively. Lidding material 1314 is then in contact with the upper runs of cords 1341 and 1329 on the inner cord assemblies 1340 and 1328, respectively. In this fashion, lidding material 1314 is suitably formed into an inverted channel. The channel created by the stretched web 1314 has an upper middle portion extending downward along either side of conveyor so that the inverted channel surrounds the trays from the top and two sides.

Referring now to FIG. 16, a cross-sectional illustration of the stretching apparatus of FIG. 15 is illustrated. FIG. 16 shows the cross-section of the apparatus 1300 of FIG. 15 where the only set of cord assemblies that are shown are cord assemblies 1330 and 1332, whereas FIG. 17 shows a cross-section illustration of the stretching apparatus 1300 of FIG. 15 where the two sets of inner and outer cord assemblies are shown disposed adjacent on opposite sides of the conveyor. In FIG. 17, outer cord assemblies 1330 and 1332 angle downwardly as they continue from the entrance to the apparatus to the exit, and inner cord assemblies 1340 and 1328 also angle downwardly as they travel from the entrance to the exit of the apparatus. Inner cord assemblies 1340 and 1328 terminate ahead of outer cord assemblies 1330 and 1332.

FIG. 16 shows a cross-sectional illustration of the apparatus of FIG. 15 after termination of the inner cord assemblies 1340 and 1328. Outer cord assemblies 1330 and 1332 are shown in conjunction with gripping chain assemblies 1350 and 1352. Gripping chain assemblies 1350 and 1352 have a gripping chain 1354, and 1356, respectively trained in an endless fashion about gripping chain assemblies 1350 and 1352. The edges of the lidding material 1314 at the edges 1358 and 1360 are held captive to the gripping chain assemblies 1350 and 1352 by the lower run of the gripping chains 1354 and 1356, respectively. Lidding material 1314 is therefore positioned against the lower runs of cords 1331 and 1333. From the lower runs of cords 1339 and 1332, lidding material 1314 is directed upwards and is in contact with the tray 1362 at the upper surface in a stretched manner. Outer cord assemblies 1330 and 1332 include cords 1331 and 1333 trained in an endless fashion about the cord assemblies 1330 and 1332, respectively. Any outer or inner cord assembly can include drive wheels, such as 1364 and 1366, to drive cords in an endless manner about the cord assemblies. Depending on whether cord assemblies are the inner or outer assemblies, the lidding material can be positioned on the lower or upper run of cord.

Figure 18:
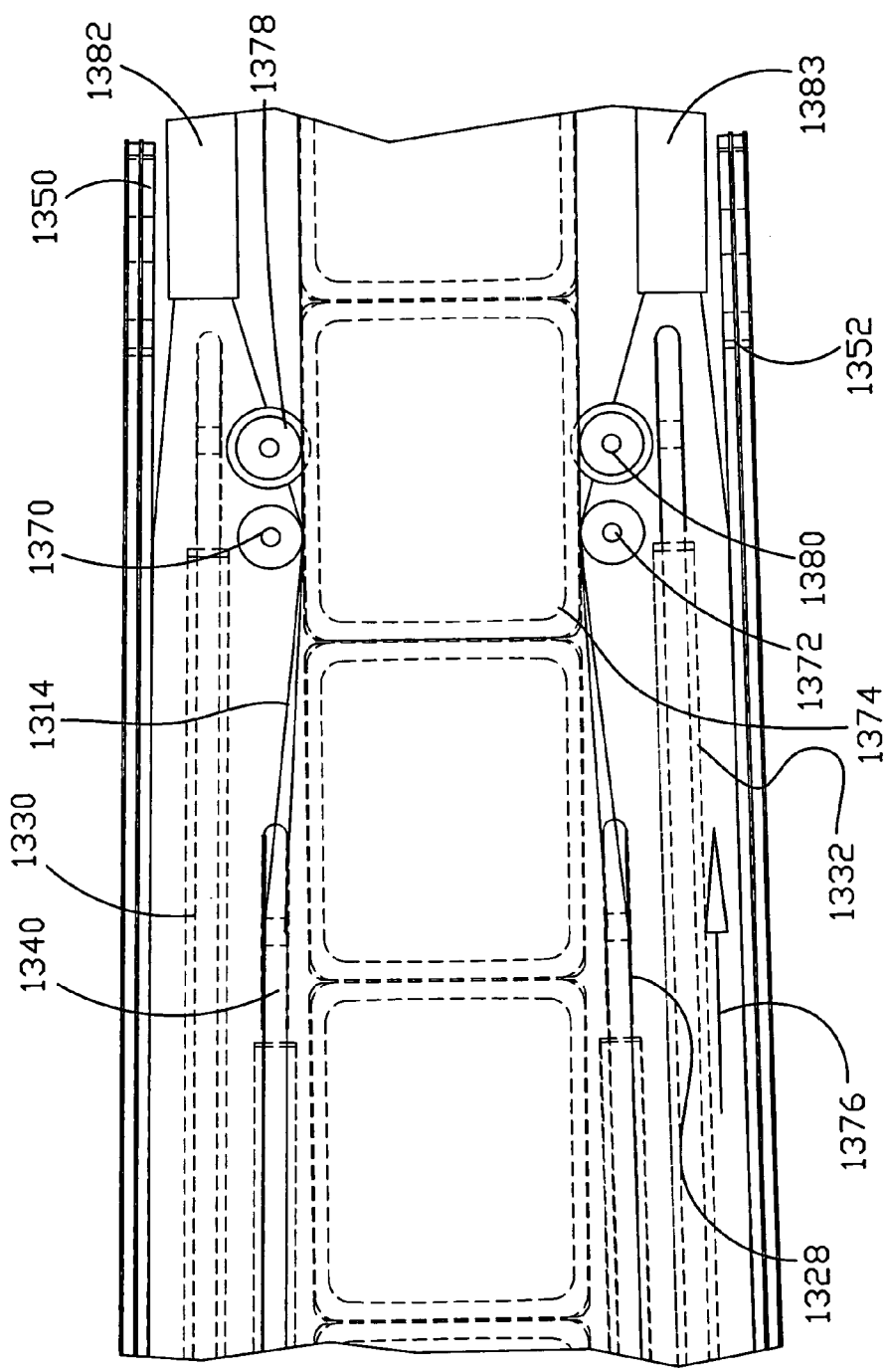
FIG. 18 shows a plan view illustration of the web stretching arrangement in an apparatus for applying a biaxially stretched web of material to the upper surface and side walls of a tray with channels formed therein according to the present invention.

Referring now to FIG. 18, a top plan view of a section of the stretching apparatus of FIG. 15 is illustrated. Gripping assemblies 1350 and 1352 are located exterior to the conveyor and to the inner 1348, 1340 and outer 1330, 1332 cord assemblies. The web 1314 is carried forward in the direction of the arrow 1376. Inner cord assemblies 1340 and 1328 terminate ahead of outer cord assemblies 1330 and 1332. The web 1314 is stretched over inner cord assemblies 1340 and 1328, and beneath outer cord assemblies 1330 and 1332. Rollers 1370 and 1372 are positioned adjacent to conveyor and in close proximity to passing tray 1374. Rollers 1370 and 1372 are located in the apparatus only after inner cord assemblies 1340 and 1328 have terminated. Rollers 1370 and 1372 are allowed to roll about an axis that is substantially perpendicular to a horizontal plane. Rollers 1370 and 1372 are arranged so as to press the web 1314 against the side flaps of the tray 1374.

Rollers 1370 and 1372 can have an annular raised section or bump located about the periphery of the roller body. The bump corresponds to the recess 1112 of the tray illustrated in FIG. 11. In this manner, the web 1314 can be pushed against the adhesive bead 1114 located in the recess 1112 of the tray of FIG. 11. Slitting means 1378 and 1380 cut the excess material from the edges of the web 1314. The excess material is then removed through evacuation through conduits 1382 and 1383 after release by the gripping assemblies 1350 and 1352. Traverse slitting means (not shown) can be used to cut the web 1314 in a traverse direction between trays.

Figure 19:
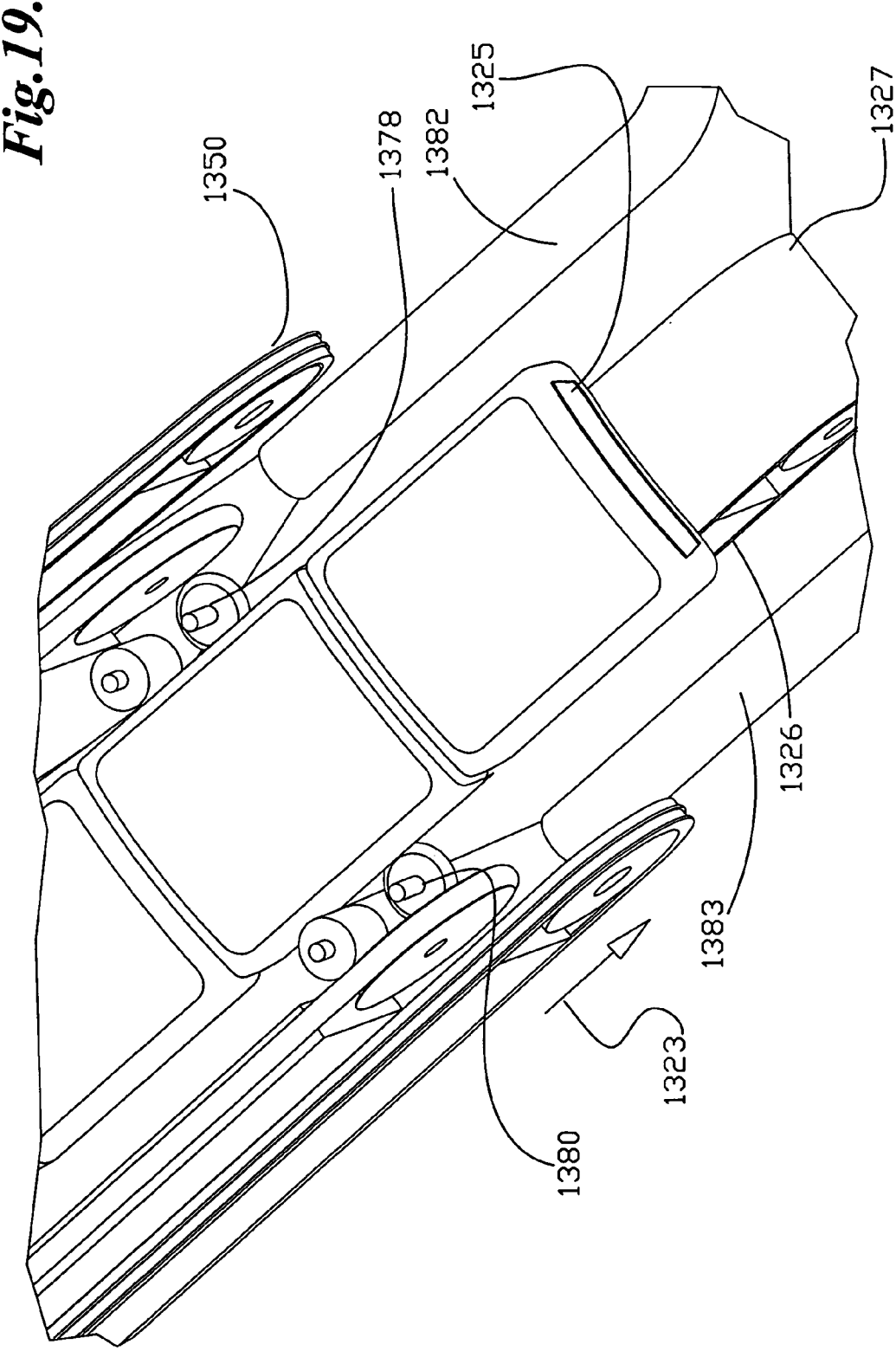
FIG. 19 shows a perspective illustration of the web stretching arrangement in an apparatus for applying a biaxially stretched web of material to the upper surface and side walls of a tray according to the present invention.

Referring now to FIG. 19, a three-dimensional view of the web stretching apparatus is illustrated. A section of the web 1314 has been deleted so as to show a clear view of the apparatus. Tray 1325 is transported on the conveyer belt 1326 in the direction shown by the arrow 1323. Gripping assemblies 1350 and 1352 release the web 1314 after slitters 1378 and 1380 have removed the excess web material. The excess material is removed through evacuation through conduits 1382 and 1383.

Figure 30:
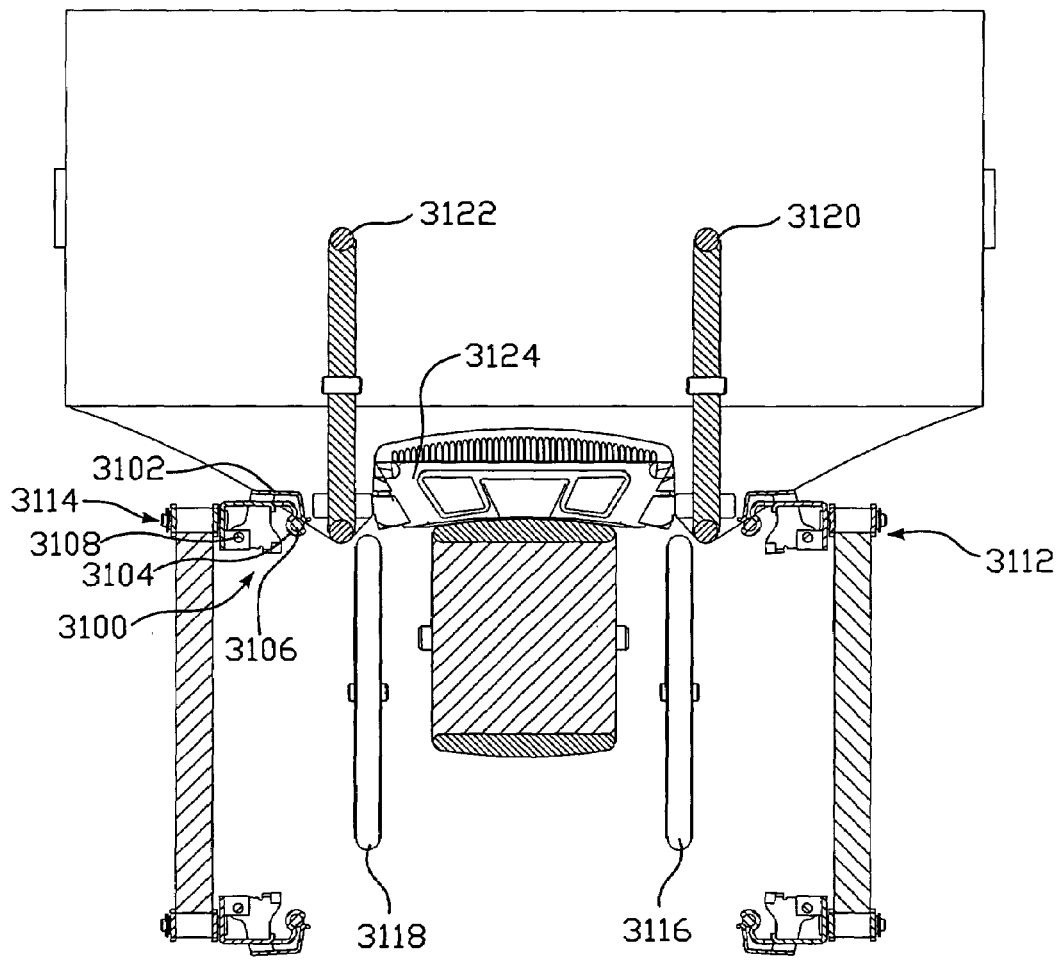
FIG. 30 shows a cross section illustration of the web stretching arrangement in an apparatus for applying a biaxially stretched web of material to the upper surface and side walls of a tray with channels formed therein according to the present invention.
Figure 31:
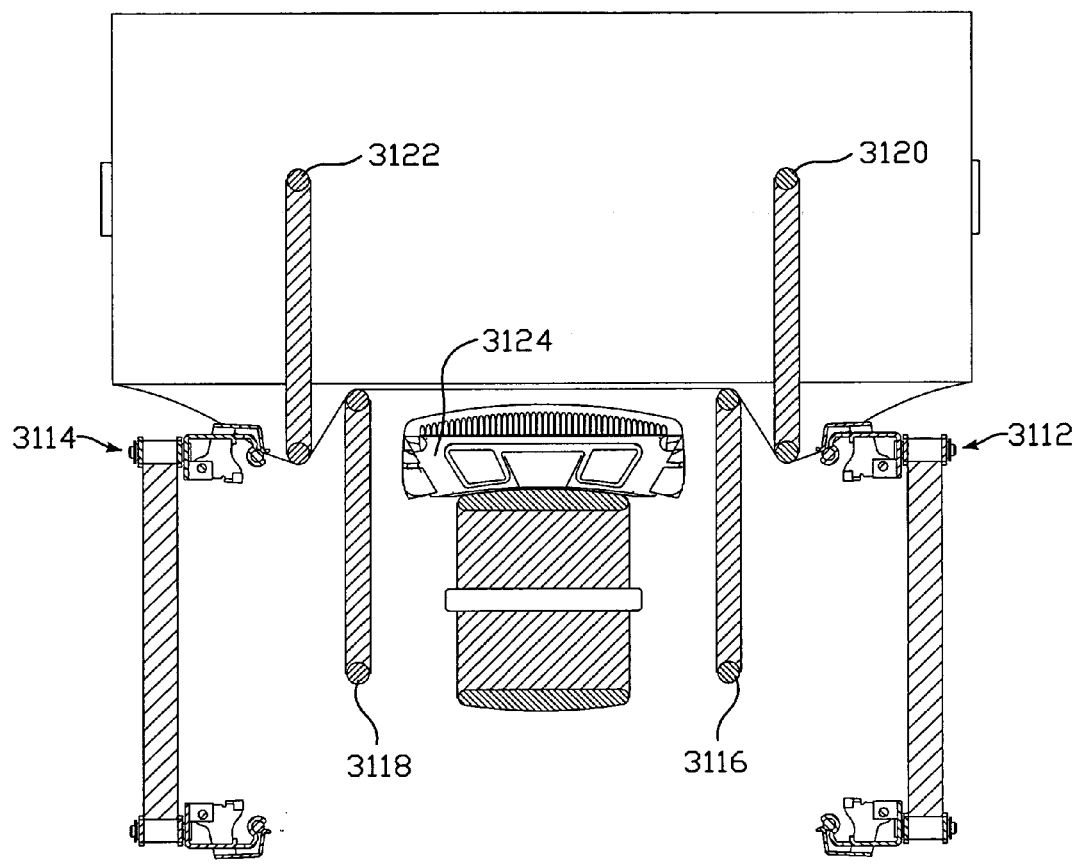
FIG. 31 shows a cross section illustration of the web stretching arrangement in an apparatus for applying a biaxially stretched web of material to the upper surface and side walls of a tray web according to the present invention.

As shown in FIGS. 30 and 31, the gripping means 3100 comprises upper and lower jaws 3102 and 3104, respectively. The upper jaw 3102 includes a portion extending horizontally at an upper surface. The portion extends vertically downward to make contact with an elastomeric rubber rod 3106. On the opposite side, a vertical arm connects the upper jaw to a pivoting mechanism 3108. The lower jaw 3104 holds the rubber rod 3106. A suitable spring (not shown) biases the upper and lower jaws into contact. The upper jaw 3102 can be actuated to open, to allow insertion of a lateral edge of a lidding web 3110 and to close, thus gripping the lidding web 3110 between the end of the upper jaw and the rubber rod 3106. It is to be appreciated that the operation of all other gripping means is similar. Also shown in the alternate embodiment is the web 3110 being gripped by the upper portions of the gripping chains 3112, 3114 rather than the lower portions, as earlier described. The separate embodiments illustrate how different arrangements of the inner, 3116 and 3118, and outer, 3120 and 3122, cords and the web gripping chains 3112, 3114 can be configured for the purpose of achieving a biaxially stretched lidding web 3110 prior to bonding to a tray 3124.

Figure 20:
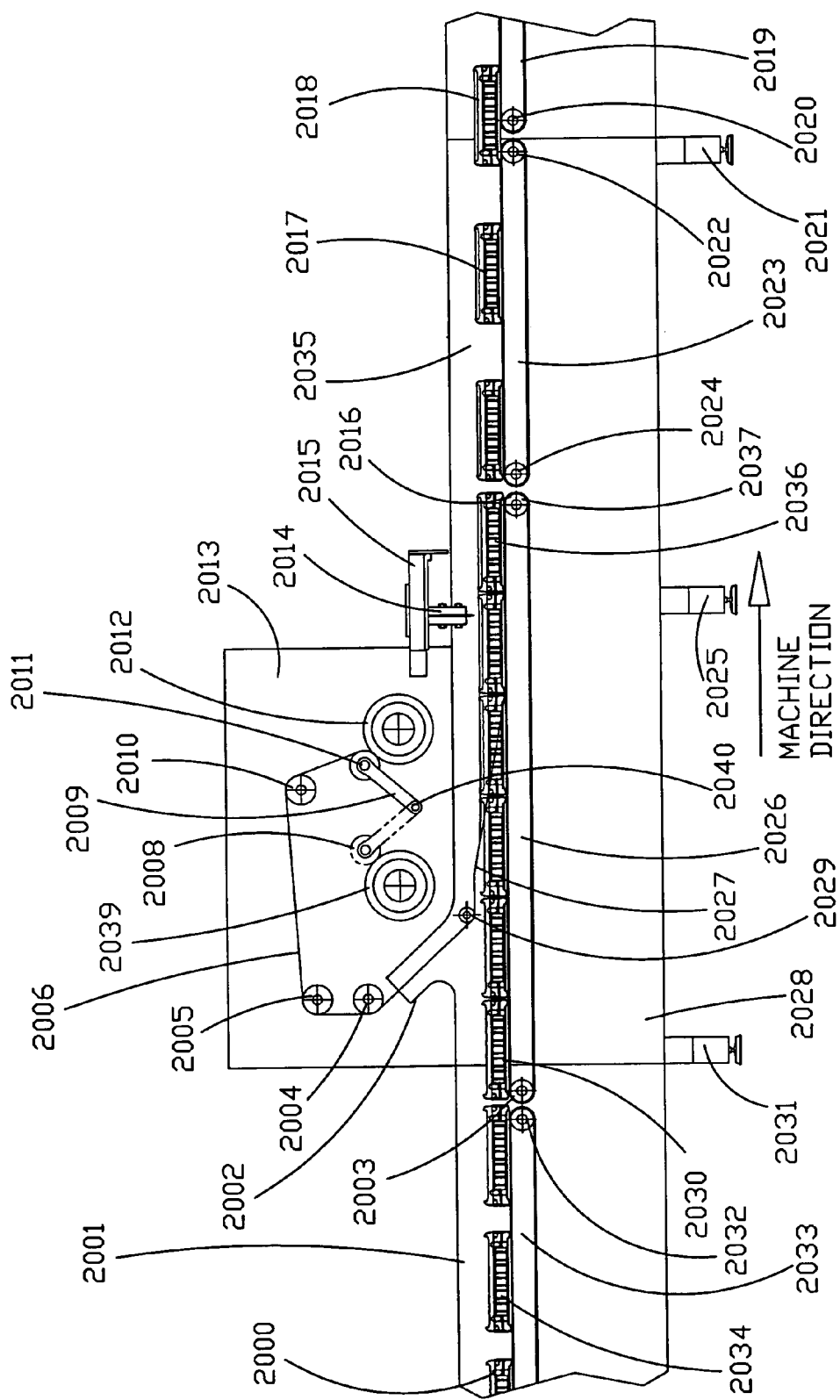
FIG. 20 shows a side elevation illustration of a biaxial stretch packaging apparatus according to the present invention.

Referring now to FIG. 20, a front elevation illustration of an alternate embodiment of a stretch packaging apparatus that has been constructed for the purpose of sealing a biaxially stretched web of material to a continuously moving stream of packaging trays, with goods loaded therein, is shown. One embodiment of the packaging apparatus includes multiple horizontal conveyors 2033, 2026, 2023, and 2019. Horizontal conveyors 2033, 2026, 2023, and 2019 are arranged to carry loaded packaging trays 2000, 2034, 2017, 2018, and 2030 in the machine direction shown from left to right in FIG. 20. The conveyors 2019, 2023, 2026, and 2033 are enclosed from the exterior in an enclosure 2001. The enclosure is supported by legs 2031, 2025, and 2021. The enclosure 2001 contains a selected gas provided in the interior space 2035 within the enclosure 2001. The gas pressure inside the enclosure 2001 can be greater than the ambient atmospheric pressure. The gas may include blends of gases having a majority of the gas being carbon dioxide, carbon monoxide, or nitrogen, for example. However, other embodiments use oxygen atmospheres having oxygen amounts that may be greater than the amounts of oxygen found in the air. Each conveyor section can have one idler roller and a drive roller disposed on either end of the conveyor. Conveyor 2033 is driven by drive roller 2032. Conveyor 2026 is driven by drive roller 2037. Conveyor 2023 is driven by drive roller 2022. Conveyor 2019 is driven by a roller not shown, and wherein the drive roller is mounted at the opposite end of idler roller 2020. Conveyors 2033, 2023 and 2019 travel at a rate faster than the centrally located conveyor 2026. The variation in conveyor speed facilitates the transfer of trays such as 2000 and 2034 onto conveyor 2026, so as to maintain a space between said trays when on conveyor 2033, however when transferred to conveyor 2026, the trays 2030 and 2036 will contact each other and the trays adjacent thereto.

The enclosure 2001 is connected to a backing plate 2013, fixed to an upper portion of the enclosure 2001. A web unwinding mechanism is mounted to the backing plate 2013. The source of a web material 2006 is one of two rolls of web material 2039 and 2012 that are mounted to the backing plate 2013, enabling lidding web material 2006 to be unwound therefrom. The web 2006 is wound over idler rollers 2010, 2005, 2004 and 2029. Tensioning of web 2006 is facilitated by surface drive mechanism 2011. Surface drive mechanism includes a drive roller connected to an arm 2009 which pivots about pivot 2040, enabling an alternative drive position wherein drive roller at position 2008 engages with the surface of web roll 2039. However, as shown in FIG. 20, web 2006 is unwound from roll 2012. Web 2006 is carried over idler rollers 2010, 2005, 2004, and 2029. The lateral edges of web 2006 are gripped by gripping mechanisms that will be described below. Gripping mechanisms pull the web 2006 in the same direction as the conveyor direction. As the web 2006 is pulled in the conveyor direction, tensioning by surface drive mechanism 2011 can induce longitudinal stretching of stretchable materials. Surface drive mechanism can drive the speed of the web roll 2012 at a slower speed than the speed of the conveyor so as to induce a controlled rate of stretch to the web. Alternatively, rigid or semi-rigid materials can be used instead of stretchable materials and would be placed under tension but may have little or no stretch and speeds at surface drive mechanism and conveyor can be substantially the same. Web 2006 enters enclosure 2001 through narrow opening 2002. The pressure in enclosure 2001 prevents atmospheric air from entering the enclosure 2001. Web stretching subassemblies, described below, are mounted to a pair of horizontally disposed timing belts on opposite sides of the conveyor, and are driven so as to carry web 2006 along a path that is denoted by line 2027. The web is eventually brought to the level of the trays. Pressure sensitive adhesive is applied to all trays, including 2000 and 2034. Web 2006 will be stretched longitudinally and laterally before bonding to trays. After bonding, a cutting mechanism 2015 is located above the continuous stream of loaded trays such that blade holder 2014 reciprocates in a hunting motion parallel with the conveyor direction along a retaining linear bearing to sever the lidding web 2006 while the trays move forward, without stopping to sever the web. Blades held in blade holder 2014, enable lateral cutting of web 2006, after bonding to trays wherein the severing occurs between each tray. Blades held by blade holder 2014 can be controlled with a suitable vision system that recognizes the location between each tray, and automatically positions the blades to enable lateral cutting of the web between each tray.

Figure 21:
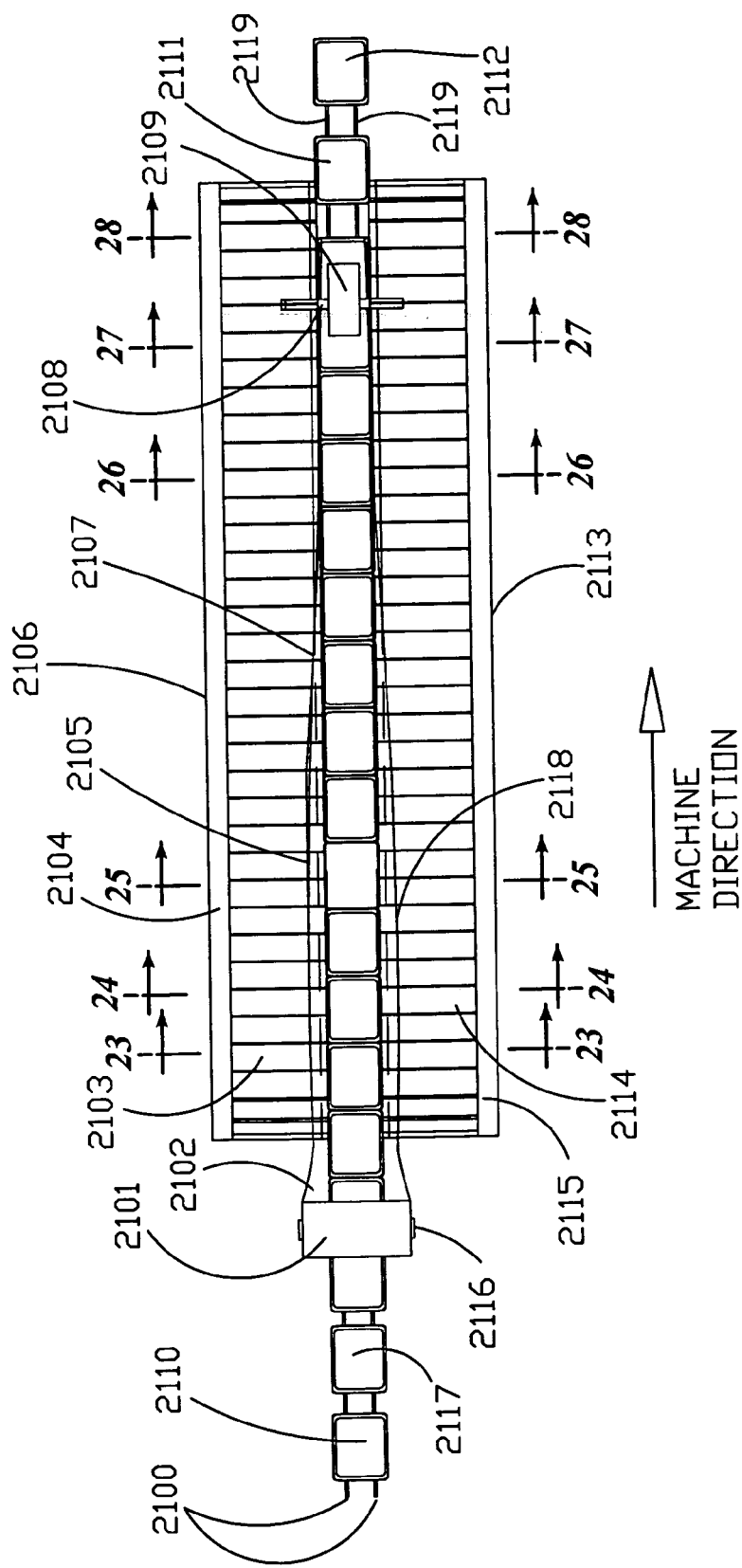
FIG. 21 shows a plan view illustration of a biaxial web stretching apparatus according to the present invention.

Referring now to FIG. 21, a plan view illustration of a web stretching assembly that can be mounted to a packaging apparatus is shown. The apparatus of the present invention can biaxially stretch a web, meaning tension is applied to the web both longitudinally and laterally. The tension reduces any creases or ripples that are unattractive to the consumer and also enables tensioned contact with goods in the tray cavity, at the central portions thereof. The web stretching apparatus includes web stretching subassemblies, timing belts, cam followers, and cam tracks. The web stretching assembly comprises a plurality of similarly constructed web stretching subassemblies attached to a pair of timing belts. Web stretching subassemblies are also in contact with the cam tracks, described below. The cam tracks allow for and guide the operation of the web stretching subassemblies. A continuous stream of loaded trays, including 2110 and 2117, are carried on horizontal conveyors 2100 in a left to right direction. A series of web stretching subassemblies, including 2103 and 2114, are mounted onto a pair of right and left side timing belts 2106 and 2113. The timing belts 2106 and 2113 are, in turn, mounted to a common drive pulley and suitable idler pulley fixtures. Cam tracks 2104 and 2115 are constructed in a fixed position adjacent the timing belts. The web stretching subassemblies, including 2103 and 2114, are designed with cam follows that ride on the cam tracks. Cam tracks are designed to follow a particular path that will direct cams and shafts attached thereto to reciprocate laterally and to open and close a web gripping jaw on every web stretching subassembly. The web stretching subassemblies are designed to grip lateral edges of web 2102 and apply lateral and longitudinal tension to the web such that its width is reduced as shown at locations 2105 and 2118 in FIG. 21, due to the longitudinal stretching. Web stretching subassemblies are mounted to and carried on the timing belts, and can therefore tension and also stretch web 2102 laterally and over trays carried on conveyors 2100. A lateral cutting mechanism is shown wherein blade holder 2108 is mounted to linear bearing 2109. A reciprocating drive mechanism is described below in association with FIG. 27 wherein an assembly of lateral cutting blades enable cutting lateral cutting of the web as required. After lateral cutting of the web, finished trays, such as 2111 and 2112, are transferred by conveyor 2119 to further processing or packaging operations, that may include packaging in a master container or any other suitable container.

Figure 22:
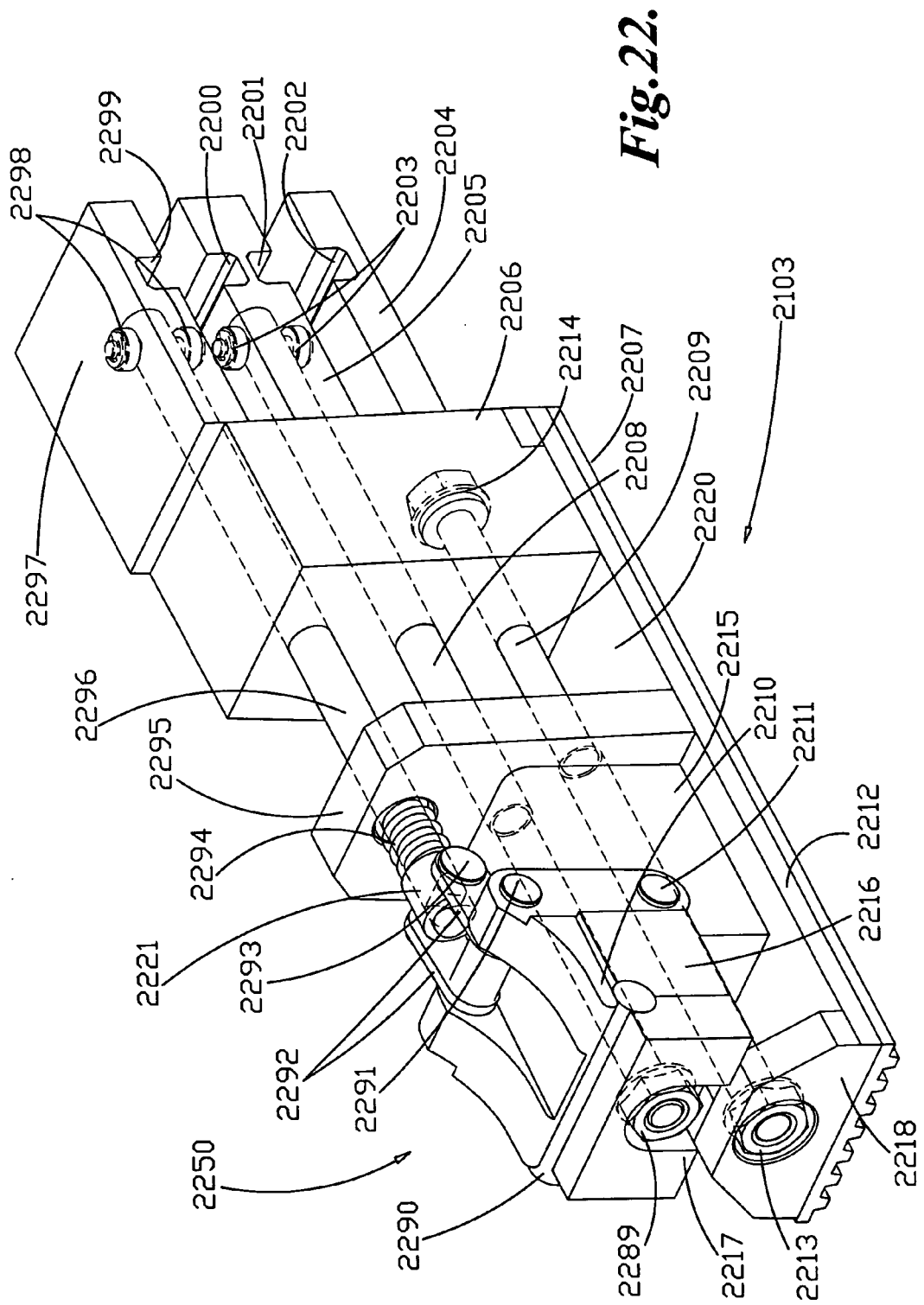
FIG. 22 shows an isometric illustration of a web stretching subassembly with web gripping subassembly and cam track portions according to the present invention.

Referring now to FIG. 22, a three dimensional illustration of a web stretching subassembly, such as web stretching subassembly 2103 of FIG. 21, is shown. The web stretching subassembly 2103 is intended for use in conjunction with a plurality of similar devices wherein all such subassemblies are mounted onto a timing belt. At least two timing belts 2106 and 2113 are arranged to travel in a horizontal disposition on either side of a conveyor as shown in FIG. 21.

A section of a timing belt 2207 is shown with a base plate 2212 attached on an upper surface of the timing belt. The base plate 2212 is rigidly fitted to an end plate 2218 and at the opposing end of the base plate, a block 2206, is fixed rigidly to the base plate 2212. The block 2206 has apertures to accommodate a number of shafts 2209, 2208, and 2296 therethrough. Shafts 2208 and 2296 traverse the block 2206 and extend between upper 2297, middle 2205, and lower 2204 cam track plates. Shafts 2208 and 2296 can be actuated horizontally to operate the web stretching subassembly, as dictated by the direction of the cam tracks in the cam track plates. The shaft 2209 is threaded at both ends, and nuts 2213 and 2214 hold the shaft 2209 in a rigid and horizontal position with base plate 2212 and timing belt section 2207. A web gripping subassembly 2250 is provided between rigid block 2206 and end plate 2218. The web gripping subassembly 2250 is a part of the larger web stretching subassembly 903. The web gripping subassembly can slide on shaft 2209. The web gripping subassembly 2250 can move in the lateral direction between the extremes of the block 2206 and the end plate 2218. The web gripping subassembly 2250 has a machined block 2215 centrally disposed between the plate 2295 and jaw block 2216 and jaw end plate 2217 all arranged in a relatively fixed position to each other, and held together by shaft 2208 with nut 2289 tightened onto a threaded end. Shaft 2208 also connects the web gripping subassembly 2250 to block 2206. Upper gripping jaw 2210 is mounted to pivot at location 2211. When closed, upper gripping jaw 2210, contacts a cylindrical rubber member 2290, manufactured from a suitable extruded or molded rubber compound. Upper jaw 2210 can thusly be actuated open and closed, so that in the closed position, jaw 2210 and rubber member 2290 are compressed against one another. Block 2215 and end plate 2295 are in touching proximity to upper surface 2220 of base plate 2212 and block 2215 and plate 2295 can slide or otherwise move along the upper surface of the base plate 2212. Shaft 2296 is attached to upper gripping jaw 2210 at the pivot pin 2291 via a pair of connecting arms 2292 and coupling 2221. A spring 2294 is mounted onto the shaft between the plate 2295 and the upper gripping jaw 2210, so as to exert suitable expanding pressure between plate 2295 and shaft end 2221. Spring 2294 is arranged such that in a free condition, expanding pressure provided by spring 2294 causes upper gripping jaw 2210 to close suitably against rubber section 2290, and in a manner that will facilitate the gripping of an edge of a flexible web material, including thin gauge pPVC. Shaft 2296 is fitted with a pair of cam followers 2298, at the end opposite of the jaw 2210, and arranged to engage with cam tracks 2299 and 2200, machined in upper cam track plate 2297 and middle cam track plate 2205. Similarly, a pair of cam track followers 2203 are arranged to engage with cam tracks 2201 and 2202, machined in middle cam track plate 2205 and lower cam track plate 2204. It is apparent that cam track plates 2297, 2205 and 2204 only constitute a portion of the total cam track structure wherein the cam track structure can lie adjacent the web as shown in FIG. 21. It is also apparent that cam track plates are relatively stationary to the web stretching subassembly, so that the web stretching subassembly will travel along and the operation of individual web stretching assemblies will be dictated by the cam tracks. A plurality of cam track plates may extend along on both sides of the horizontal conveyors for any length that is necessary to apply lidding web to trays. Cam followers 2203 on shaft 2208 will ride in cam tracks 2201 and 2202, and will correspondingly cause web gripping subassembly jaw and blocks attached therewith, to move between end plate 2218 and end block 2206. Cam tracks 2299 and 2200, wherein cam followers 2298 ride within, can be arranged to follow a similar path to cam tracks 2201 and 2202, and therefore maintain jaw 2210 in its gripping mode as required. However, when cam tracks 2299 and 2200 diverge outwardly (i.e., distally, web stretching subassembly 2103 has a distal end away from the gripping jaw subassembly 2250, and a proximal end, toward the jaw gripping subassembly) relative to cam tracks 2201 and 2202, jaw 2210 will separate from the opposing rubber member 2290 allowing any web thereby gripped, to be released.

Figure 23:
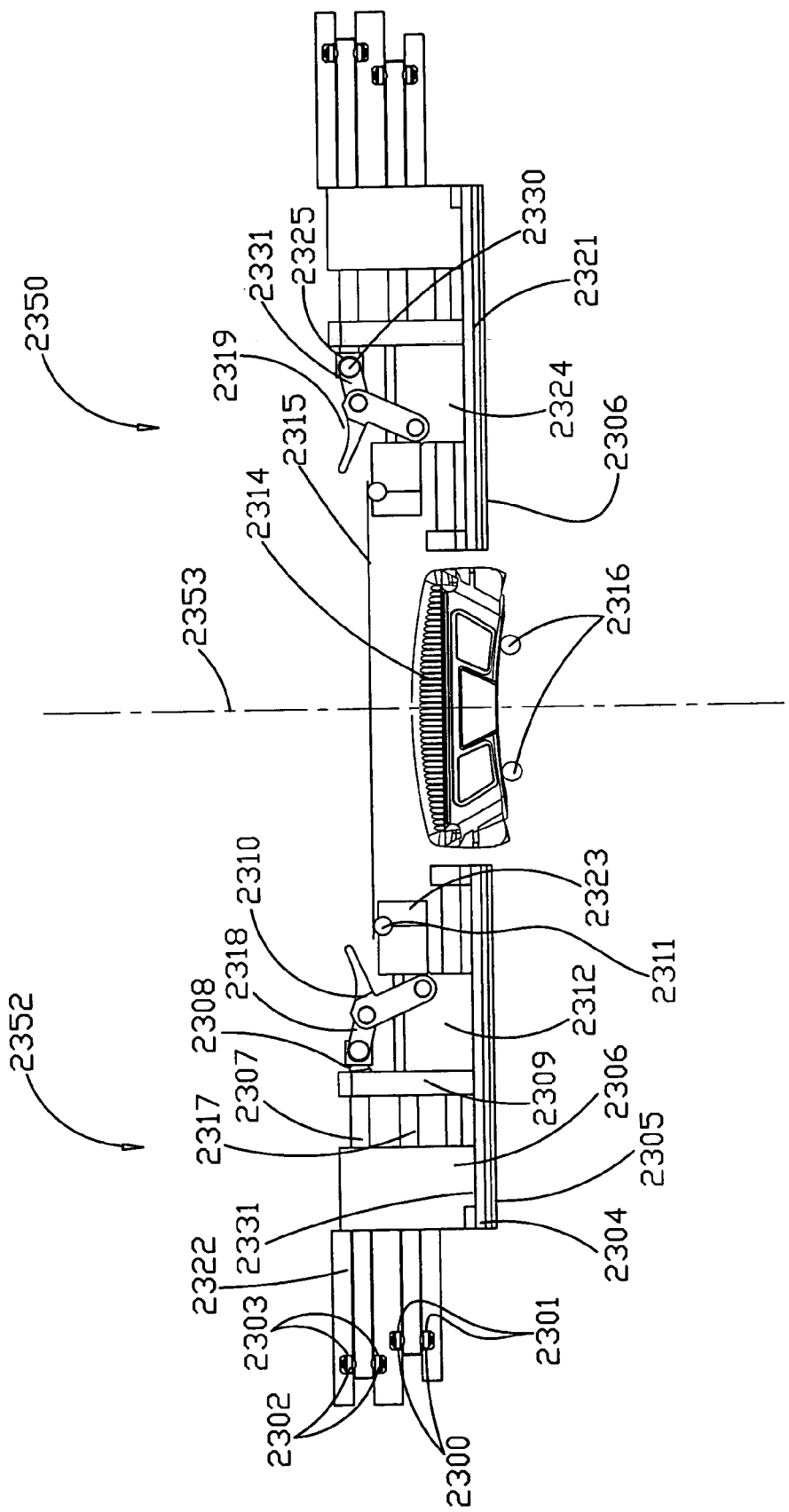
FIG. 23 shows a cross sectional view illustration, A—A, across web stretching subassembly shown in FIG. 21.

Referring now to FIG. 23, a cross-sectional view A—A through the horizontal conveyor assembly, as detailed in FIG. 21, is shown. A pair of web stretching subassemblies 2350 and 2352, are shown on opposite sides of a tray 2314. While operation of only one web stretching subassembly will be described, the operation is mirrored in the directly opposite web stretching subassembly. Cam tracks 2303 with cam followers 2302, and cam tracks 2300 with cam followers 2301, are shown in relative locations that compress spring 2308, thereby opening jaw 2310 to allow web 2315 to be placed upon rubber member 2311, and on the opposing similar rubber member on the opposite side of center line 2353. When cam tracks 2303 move outward relative to cam tracks 2301, the web gripping jaw 2310 will open. Similar cam tracks operate in a similar manner on web stretching subassembly 2350 Conveyor belts 2316 with the packaging tray 2314 mounted thereupon, are disposed to follow a path between opposing web stretching subassemblies 2350 and 2352. The pair of opposing web stretching subassemblies 2350 and 2352 are mounted onto correspondingly opposing timing belts 2305 and 2306, respectively, and are shown with web gripping jaws 2310 and 2319 in an open disposition. Web 2315 is provided, having a flat width proportionately shorter than the width as provided in roll form. This is due to the extent that when longitudinal tension is applied, the width of the web 2315 will be decreased if stretch is induced. However, the width of web 2315 can be increased by web stretching subassemblies applying lateral tension.

Figure 24:
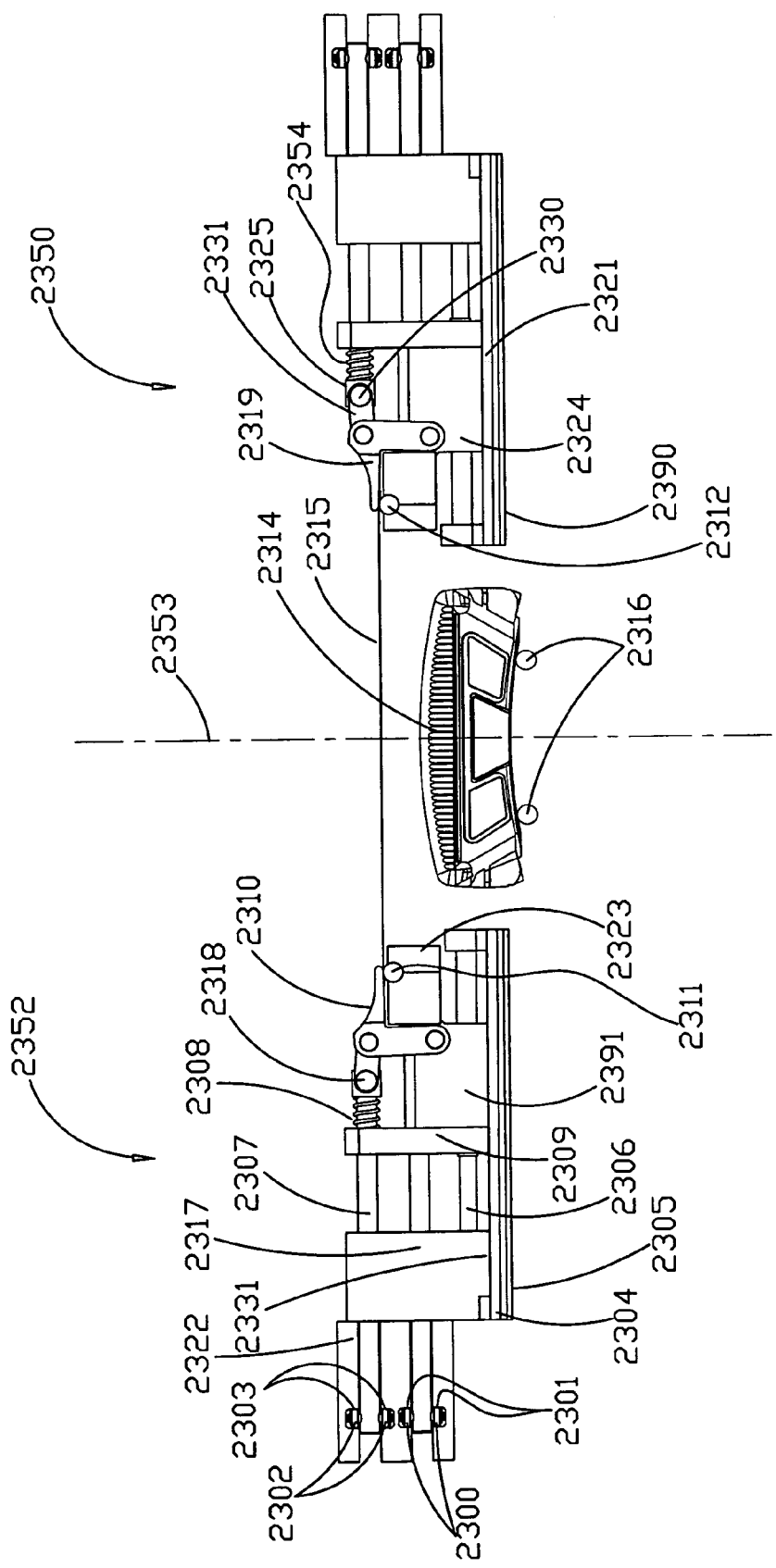
FIG. 24 shows a cross sectional view illustration, B—B, across web stretching subassembly shown in FIG. 21.

Referring now to FIG. 24, a cross-sectional view B—B through the horizontal conveyor assembly as detailed in FIG. 21 is shown. It can be seen that cam tracks 2303 with cam followers 2302 have moved inwardly relative to cam tracks 2301, and are in vertical alignment to cam tracks 2301, with cam followers 2300. Similar cam tracks operate in similar manner on web stretching subassembly 2350. Thus, jaws 2310 and 2319 have closed thereby gripping web 2315 between upper gripping jaws 2310 and 2319 and corresponding rubber members 2311, and 2312. However, web 2315 can be stretched laterally by simultaneously outwardly directing cam tracks 2303 and 2301, thereby outwardly directing the web gripping subassemblies in relation to the tray, while maintaining web gripping mode and thereby increasing the lateral tension of web 2315, prior to contact with tray 2314. It should be noted that any stretching of web 2315, most preferably will occur prior to the web contacting any bonding agent on the packaging tray 2314. Web gripping mode of jaws 2310 and 2319 is in part facilitated by springs 2308 and 2354. Springs 2308 and 2354 have expanded such that jaw 2310 and the corresponding opposing jaw 2319, are both biased in gripping contact with rubber member 2311 and the opposing rubber member 2312. Web 2315 accordingly, is gripped at both lateral edges by gripping jaws 2310 and 2319. Timing belt 2305 and opposing timing belt 2390, can remain in a horizontally disposed path and driven by a common variable-speed drive such that all web stretching subassemblies follow the same path. Cam track plates can be stationary relative to timing belts, however, cam tracks will follow the path suited for gripping and stretching web. Packaging tray 2314 travels parallel to and at the same speed as timing belts 2305 and 2390 so as to avoid moving web once web has made contact with a bonding agent. Blocks 2391 and 2324 are relatively inwardly positioned on base plates 2304 and 2321, respectively, and lateral tensioning will not begin until blocks 2391 and 2324 are biased outwardly with jaws 2310 and 2319 in the gripping mode. Alternatively, the lateral tension can be applied by fixed web gripping subassemblies, and directing the timing belts outwardly relative to the center.

Figure 25:
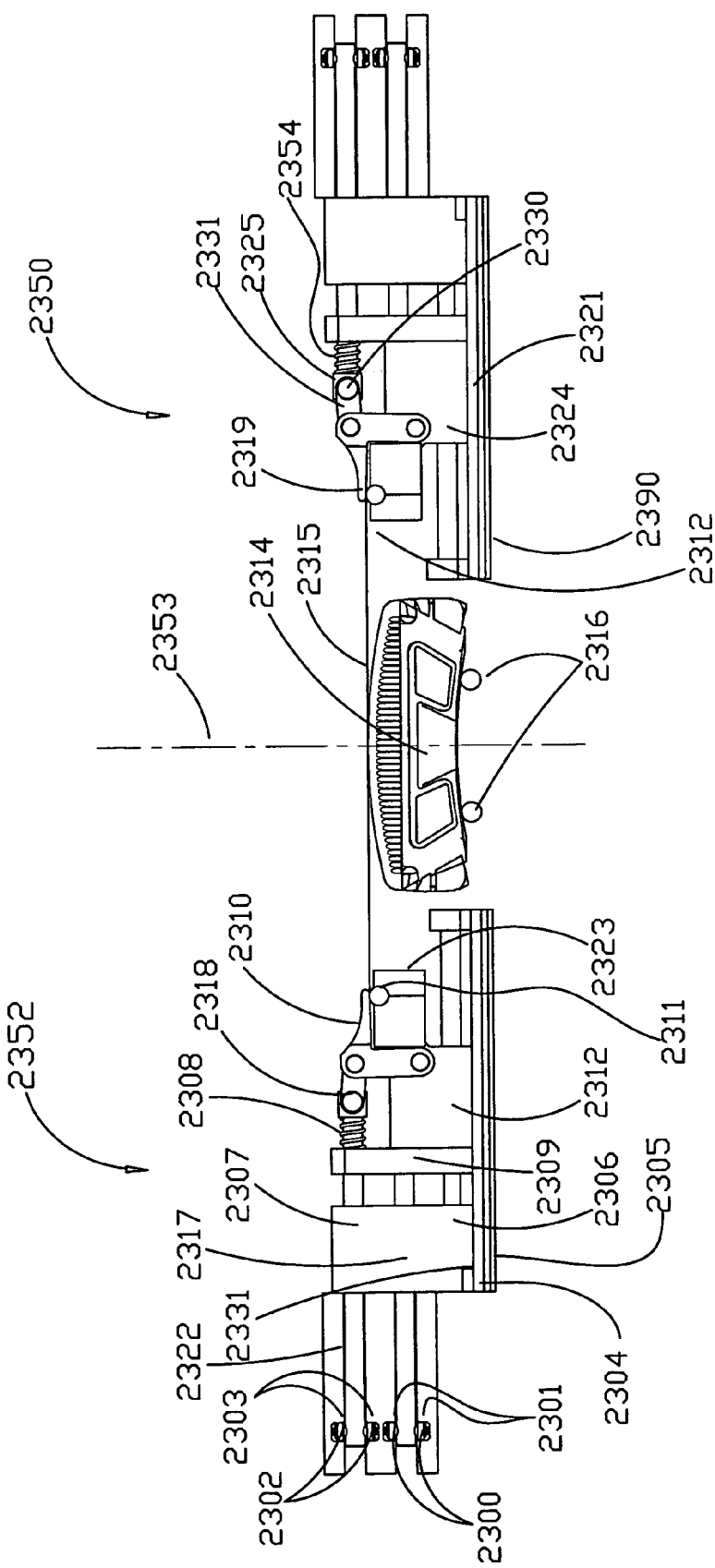
FIG. 25 shows a cross sectional view illustration, C—C, across web stretching subassembly shown in FIG. 21.

Referring now to FIG. 25, a cross-sectional view C—C through horizontal conveyor assembly as detailed in FIG. 21, is shown. Gripping jaws 2310 and the opposing jaw 2319 are shown in the gripping, closed position mode. Blocks 2391 and 2324 have been biased outward, thus putting lateral tension on web 2315 and stretching web 2315. Web 2315 is also now in contact with the uppermost surfaces of tray 2314, as a consequence of the changing relative position of conveyor belts 2316, and timing belts 2305 and 2390. Pressure sensitive adhesive beads have been applied to selected locations of tray 2314, as described in association with FIGS. 11 through 13, and are in position to allow bonding contact with web 2315. Web stretching subassemblies 2350 and 2352 travel at substantially the same speed as conveyor belts 2316 to avoid smearing adhesive beads.

Figure 26:
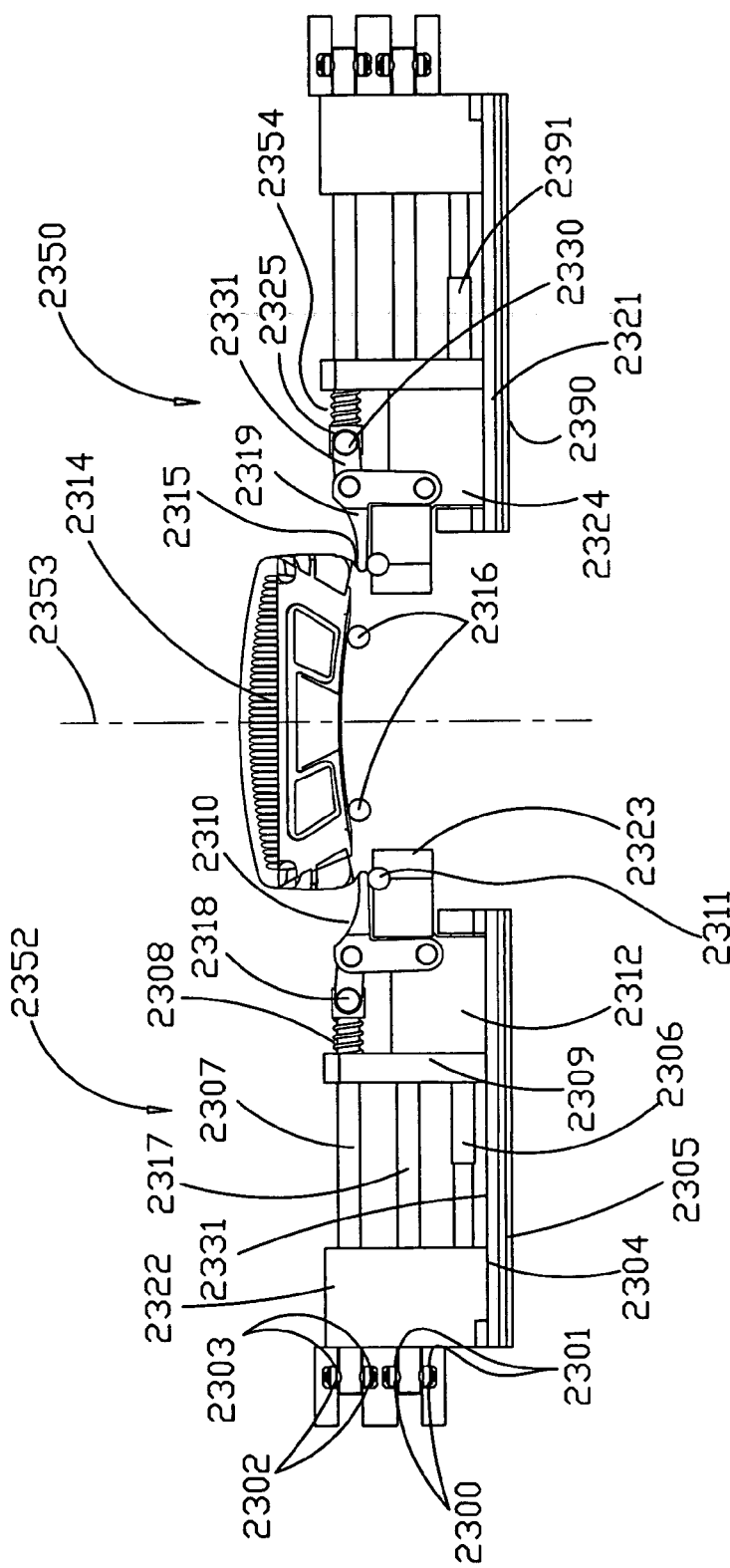
FIG. 26 shows a cross sectional view illustration, D—D, across web stretching subassembly shown in FIG. 21.

Referring now to FIG. 26, cross-sectional view D—D through horizontal conveyor assembly of FIG. 21, is shown. It can be seen that web 2315 has been wrapped around the upper surface and vertical sides of tray 2314 by controlling the relative position of timing belts 2305 and 2390 and conveyor 2316, and also by the appropriate guidance of the web gripping subassemblies. The web 2315 is wrapped under the lower corners of tray 2314, and in such a manner that web 2315 makes full bonding contact with adhesive beads applied as described in association with FIGS. 11 through 13. However, once initial contact is made between web 2315 and a bonding agent on the tray, the tension on the web is neither increased or reduced so as to cause the web neither to stretch or contract so as to avoid causing smearing of the adhesive or the formation of creases in the web. Thus, once initial contact between web 2315 and a bonding agent is made, the web width or length is substantially maintained constant while the web is being bonded to the tray. It should be noted that timing belts 2305 and 2390 are held captive by drive and idler pulleys, mounted at opposite ends. However, cam tracks have been arranged to direct web gripping subassemblies inward, along shafts 2306 and 2391. In this way, gripping jaws 2310 and 2319 can be positioned on the underside of the packaging tray 2314.

Figure 27:
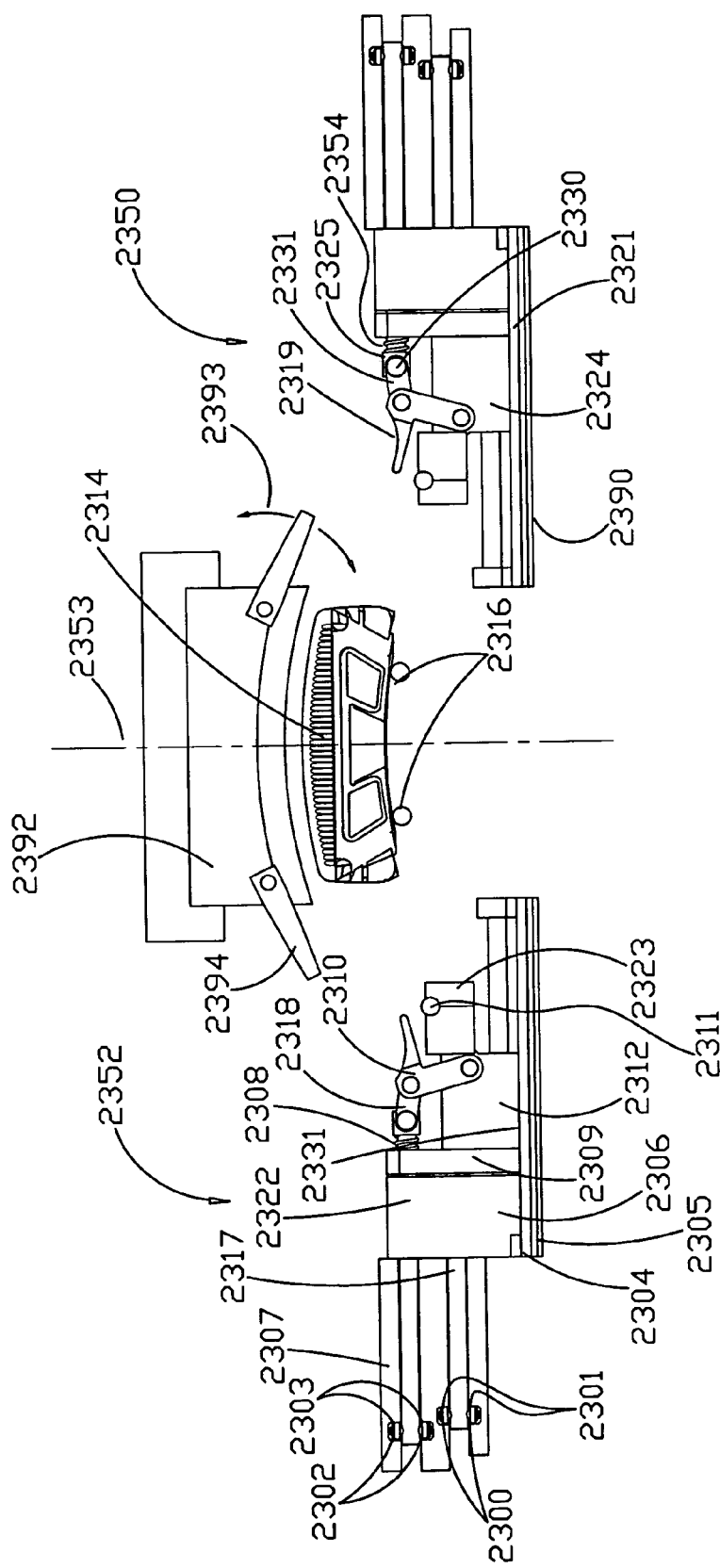
FIG. 27 shows a cross sectional view illustration, E—E, across web stretching subassembly shown in FIG. 21.

Referring now to FIG. 27, cross-sectional view E—E through horizontal conveyor assembly detailed in FIG. 21 is shown. As can be seen, the relative position of cam tracks 2303 with cam followers 2302 have moved outward relative to cam tracks 2301 with cam followers 2300 and are not vertically aligned but are arranged so as to fully withdraw and open jaw 2310, and the corresponding cam tracks and cam followers releasing opposing jaw 2319. Opening jaws 2310 and 2319 allows sufficient clearance for lateral cutting mechanism 2392, with vertical cutting blades 2393 and 2394, attached thereto, and movable in the manner as indicated by the adjacent arrow. Lateral blade 2392 is mounted to a reciprocating mechanism that follows a hunting motion, and is associated with a vision system, or an alternative mechanism, that enables the alignment of cutting blades with the space between each tray. Thus, cutting mechanism 2392 will reciprocate upwards and downwards as well as forwards and backwards. An alternative mechanism enables the synchronized release of the stretched web and withdrawal of the web stretching subassemblies; the withdrawal of selected subassemblies occurring only at locations in the vicinity of where the lateral cutting is to take place. The remaining web stretching subassemblies continue to grip the web upstream and downstream of the only withdrawn subassemblies. The remaining subassemblies are withdrawn after the web has bonded to the tray. This alternative mechanism is not shown, however in this instance, cam followers and cam tracks can be arranged to open the jaws and withdraw the jaw gripping subassemblies only at locations between trays where cutting is to occur. This location can be determined by a vision system utilizing a suitable form of radiation, including visible light, for example. Other alternative cutting devices can be used, utilizing high pressure fluids or heat, for example.

Figure 28:
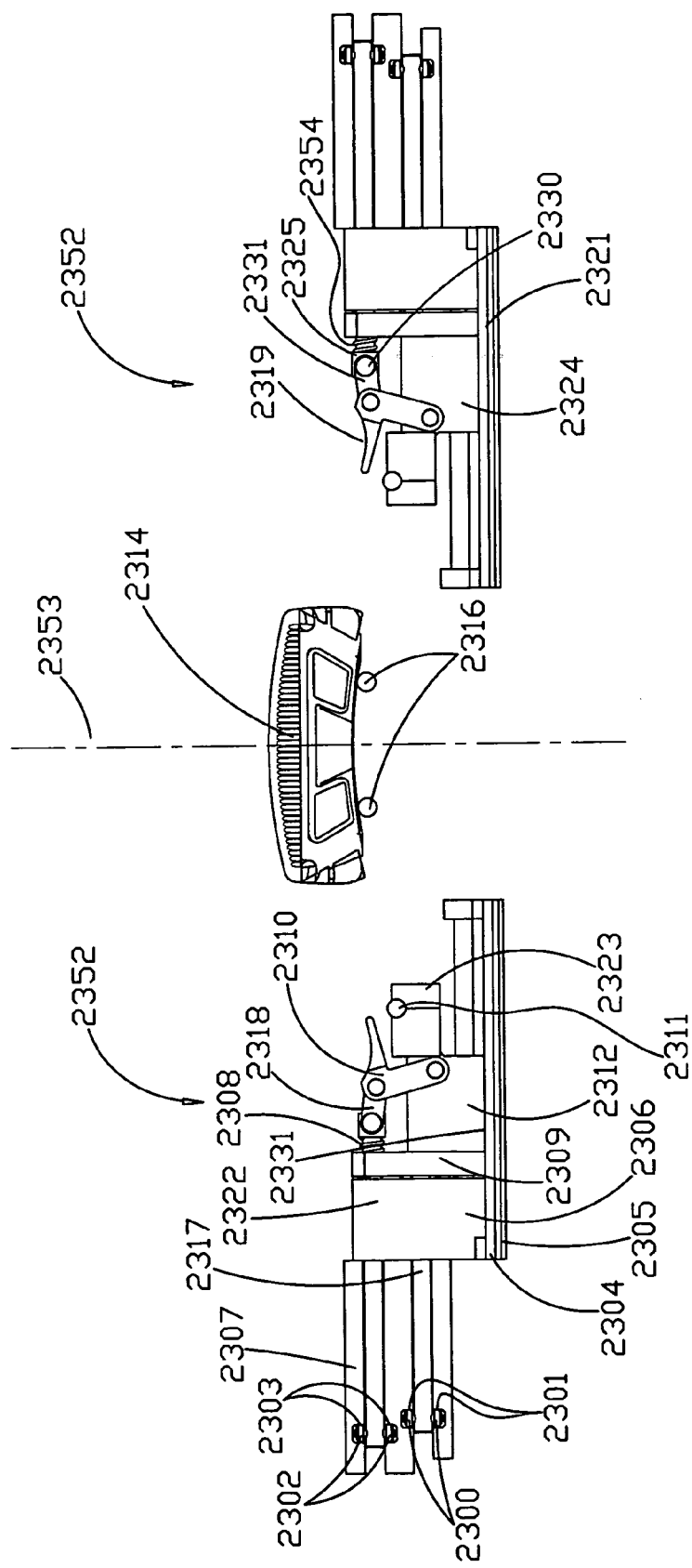
FIG. 28 shows a cross sectional view illustration, F—F, across web stretching subassembly shown in FIG. 21.

Referring now to FIG. 28, cross-sectional view F—F through horizontal conveyor assembly as detailed in FIG. 21 is shown. It can be seen that complete separation of the web stretching subassemblies 2350 and 2352 and tray 2314 has occurred. The web gripping jaws are open and are in the withdrawn position. This enables the transfer of separated trays, such as 2314, along conveyor 2316, and away from the web stretching and bonding section of the apparatus.

While the preferred embodiment of the invention has been illustrated and described, it will be appreciated that various changes can be made therein without departing from the spirit and scope of the invention.

The invention claimed is:

1. A tray, comprising:
   a material web having sides and a base to provide a product cavity, at least one of said sides defining a series of recesses with connecting channels, said channels and recesses providing a conduit when a second web is bonded at least over the cavity and side, said conduit being from the product cavity to the exterior of the web, thereby allowing transfer of gases, and minimization of liquid loss.

2. The tray of claim 1, wherein the channels to at least one recess are at different heights on the recess.

3. The tray of claim 1, wherein the channels to at least one recess are at the same height on the recess.

4. The tray of claim 1, wherein at least one channel extends from the plane of the series of recesses into a different plane.

5. The tray of claim 1, further comprising peaks along the upper side wall of the tray, wherein at least one channel extends from at least one peak.

6. A tray, comprising:
   a web of material formed into a tray container with tray cavity, said container having a plurality of recesses on a side of the tray, adjacent ones of said recesses being connected with channels, the plurality of recesses and channels together forming a path from the tray cavity to the exterior when a web of material is bonded to the tray and side.

7. The tray of claim 6, wherein the channels to at least one recess are at different heights on the recess.

8. The tray of claim 6, wherein the channels to at least one recess are at the same height on the recess.

9. The tray of claim 6, wherein at least one channel extends from the plane of the tray side into a different plane.

10. The tray of claim 6, further comprising peaks along the upper side wall of the tray, wherein at least one channel extends from at least one peak.

11. The tray of claim 6, wherein said recesses and channels are formed on a tray flap that is bonded to the side wall around the tray cavity.

* * * * *

UNITED STATES PATENT AND TRADEMARK OFFICE
CERTIFICATE OF CORRECTION

PATENT NO. : 7,093,734 B2 Page 1 of 1
APPLICATION NO. : 10/384874
DATED : August 22, 2006
INVENTOR(S) : A.J.M. Garwood It is certified that error appears in the above-identified patent and that said Letters Patent is hereby corrected as shown below:

On the Title Page:

| Item (60) Pg. 2, col. 1 | Related U.S. Application Data | "Data60/141,569," should read --60/141,569,-- |
|---|---|---|
| Item (56) Pg. 3, col. 2 | Refs. Cited (Foreign Pats., Item 24) | delete as duplicative "WO  WO 94/24875  11/1994" |

Signed and Sealed this

Twenty-seventh Day of February, 2007

JON W. DUDAS
*Director of the United States Patent and Trademark Office*